US012639672B2

(12) United States Patent　　　(10) Patent No.:　US 12,639,672 B2
Martucci　　　　　　　　　　　　　(45) Date of Patent:　May 26, 2026

(54) SYSTEM AND METHOD OF CULTIVATING A DIGITAL PROFILE

(71) Applicant: Richard Martucci, Amityville, NY (US)

(72) Inventor: Richard Martucci, Amityville, NY (US)

( * ) Notice: Subject to any disclaimer, the term of this patent is extended or adjusted under 35 U.S.C. 154(b) by 0 days.

(21) Appl. No.: 19/175,480

(22) Filed: Apr. 10, 2025

(65) Prior Publication Data

US 2025/0322364 A1　　　Oct. 16, 2025

Related U.S. Application Data

(60) Provisional application No. 63/632,823, filed on Apr. 11, 2024.

(51) Int. Cl.
*G06Q 10/1053*　　　(2023.01)

(52) U.S. Cl.
CPC .................................. *G06Q 10/1053* (2013.01)

(58) Field of Classification Search
None
See application file for complete search history.

(56) References Cited

U.S. PATENT DOCUMENTS

| | | | |
|---|---|---|---|
| 11,556,965 | B2 | 1/2023 | Soderstrom |
| 2003/0066029 | A1 | 4/2003 | Vizina |
| 2008/0004935 | A1 | 1/2008 | Marshall |
| 2012/0221477 | A1 | 8/2012 | Pande |

| | | | |
|---|---|---|---|
| 2013/0124428 | A1 | 5/2013 | Hertz |
| 2013/0204801 | A1 | 8/2013 | Downs |
| 2013/0339262 | A1 | 12/2013 | Almatrouk |

(Continued)

FOREIGN PATENT DOCUMENTS

| | | |
|---|---|---|
| AU | 2016250493 A1 | 5/2018 |
| WO | 2009045549 A2 | 4/2009 |

(Continued)

OTHER PUBLICATIONS

IPCOM000179766D"Compensating Customer Phone Waits With Charitable Donations"; The IP.com Journal, Publishing Venue IBM, Publication Date: Feb. 25, 2009; Abstract only.

(Continued)

*Primary Examiner* — Laura Yesildag
(74) *Attorney, Agent, or Firm* — Shore IP Group, PLLC; Sean R. Wilsusen

(57)　　　　　　　　ABSTRACT

A computer-implemented method of cultivating a digital profile includes receiving at least one video, a summary statement, website or social media links, a detailed description, a list of professional skills and experience ratings for each of those skills from a user. A professional rating is generated for the user based on the professional skills of the user and the level of experience rating received for each of the professional skills of the user. A personal digital profile is compiled for the user. The personal digital profile includes the personal contact information, the video, the summary statement, the website or social media link, the detailed description, the list of the professional skills, the level of experience for each of the professional skills of the user, and the generated professional rating for the user. The personal digital profile for the user is configured to be transmitted or displayed to a potential reviewer.

16 Claims, 22 Drawing Sheets

(56) References Cited

U.S. PATENT DOCUMENTS

| 2014/0358810 | A1* | 12/2014 | Hardtke | ............... | G06Q 10/105 |
| | | | | | 705/321 |
| 2015/0356512 | A1 | 12/2015 | Bradley | | |
| 2019/0205958 | A1 | 7/2019 | Fuyala | | |
| 2021/0224751 | A1* | 7/2021 | Nagalingam | ......... | G06F 40/131 |
| 2022/0414604 | A1 | 12/2022 | Bleacher | | |

FOREIGN PATENT DOCUMENTS

| WO | 2013165923 | A1 | 11/2013 |
| WO | 2015109119 | A1 | 7/2015 |

OTHER PUBLICATIONS

IPCOM000247427D; "Smarter Video Interviews by Third Party Interviewer"; The IP.com Journal, Publishing Venue IP.com PAD, Publication Date: Sep. 7, 2016; Abstract only.

* cited by examiner

FIG. 1

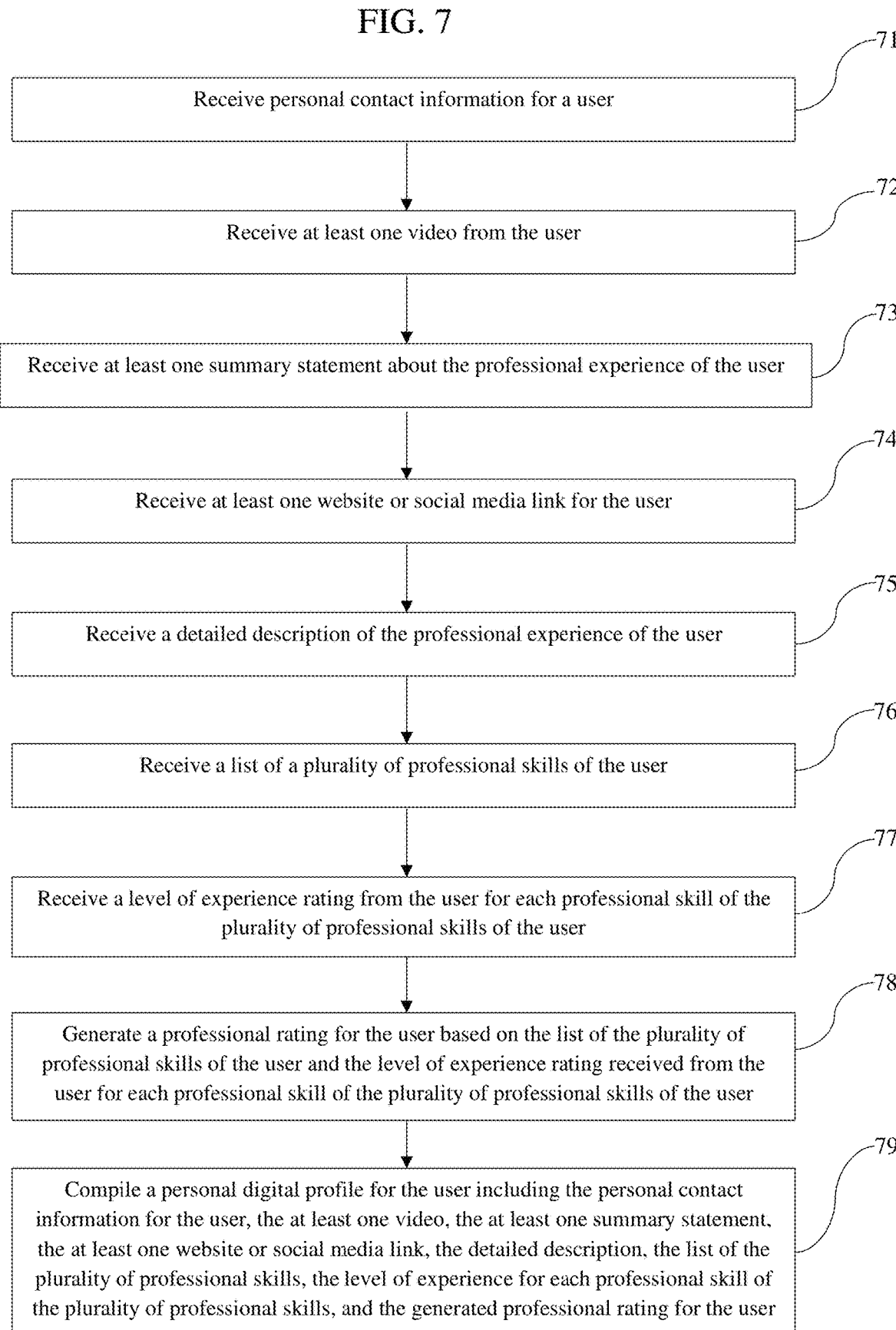

71

Receive personal contact information for a user

72

Receive at least one video from the user

73

Receive at least one summary statement about the professional experience of the user

74

Receive at least one website or social media link for the user

75

Receive a detailed description of the professional experience of the user

76

Receive a list of a plurality of professional skills of the user

77

Receive a level of experience rating from the user for each professional skill of the plurality of professional skills of the user

78

Generate a professional rating for the user based on the list of the plurality of professional skills of the user and the level of experience rating received from the user for each professional skill of the plurality of professional skills of the user

79

Compile a personal digital profile for the user including the personal contact information for the user, the at least one video, the at least one summary statement, the at least one website or social media link, the detailed description, the list of the plurality of professional skills, the level of experience for each professional skill of the plurality of professional skills, and the generated professional rating for the user

FIG. 8

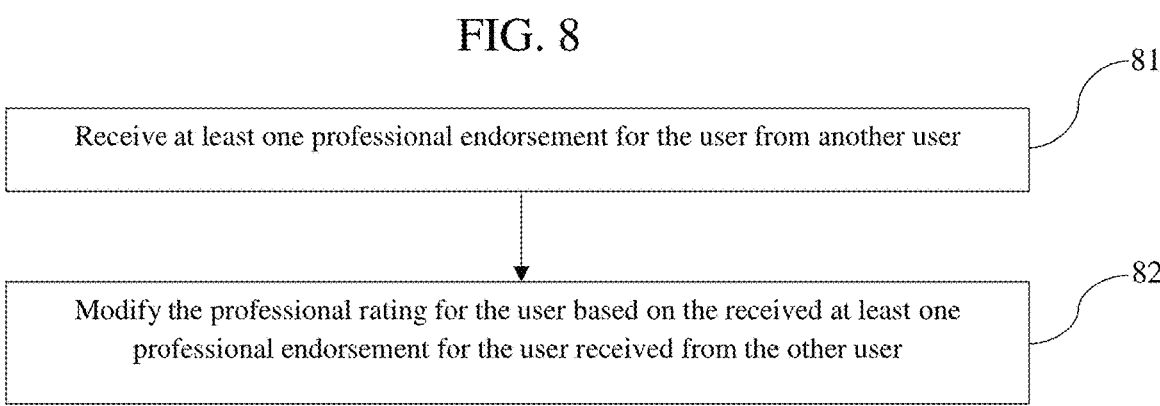

81

Receive at least one professional endorsement for the user from another user

82

Modify the professional rating for the user based on the received at least one professional endorsement for the user received from the other user

Receive at least one personal endorsement for the user from another user

92

Modify the professional rating for the user based on the received at least one personal endorsement for the user received from the other user

FIG. 10

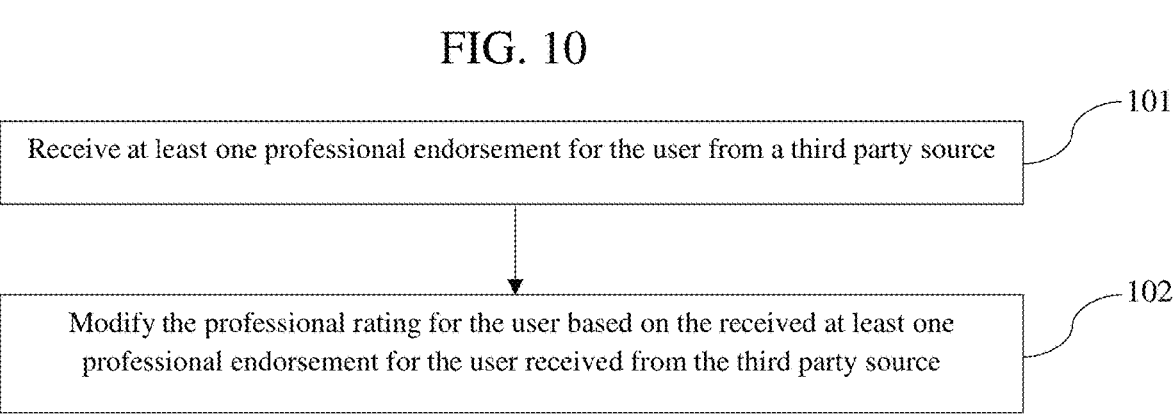

101

Receive at least one professional endorsement for the user from a third party source

102

Modify the professional rating for the user based on the received at least one professional endorsement for the user received from the third party source

FIG. 11

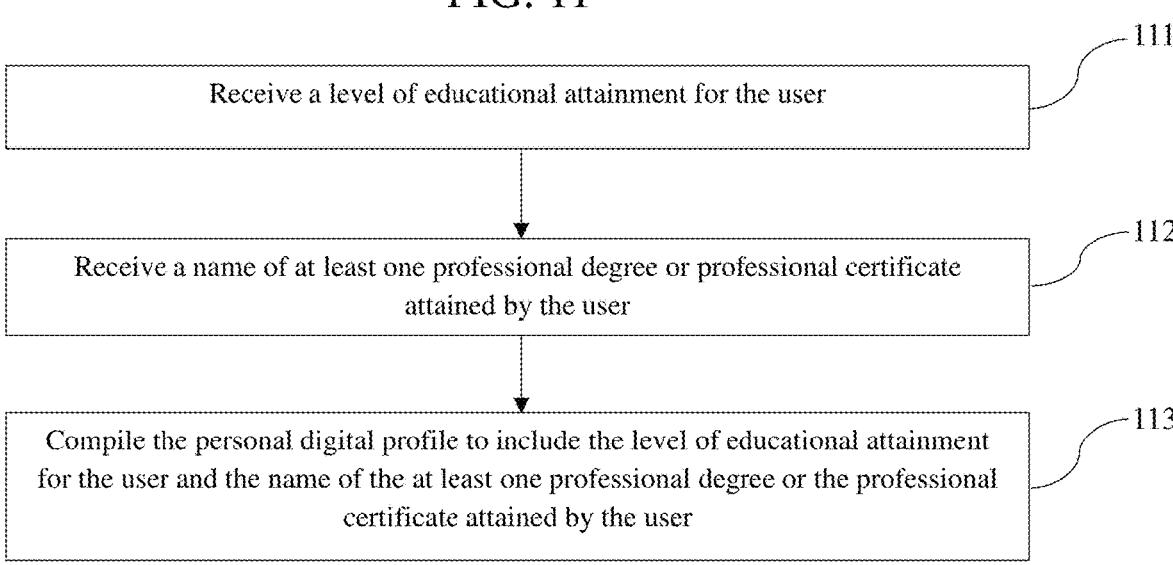

Receive a level of educational attainment for the user — 111

Receive a name of at least one professional degree or professional certificate attained by the user — 112

Compile the personal digital profile to include the level of educational attainment for the user and the name of the at least one professional degree or the professional certificate attained by the user — 113

FIG. 12

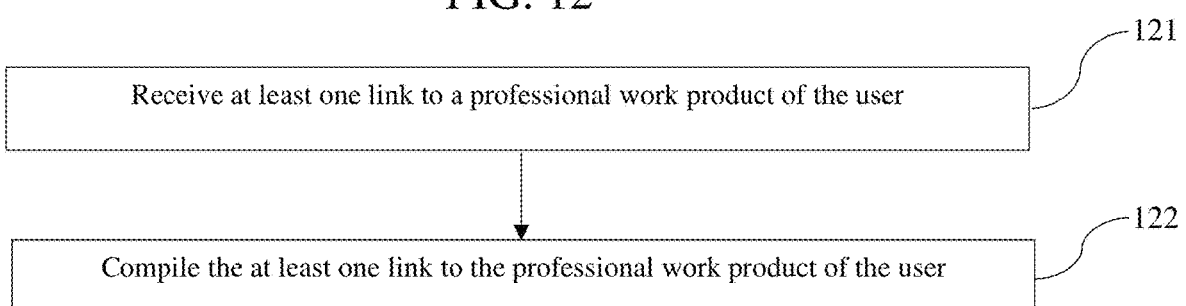

Receive at least one link to a professional work product of the user — 121

Compile the at least one link to the professional work product of the user — 122

FIG. 14

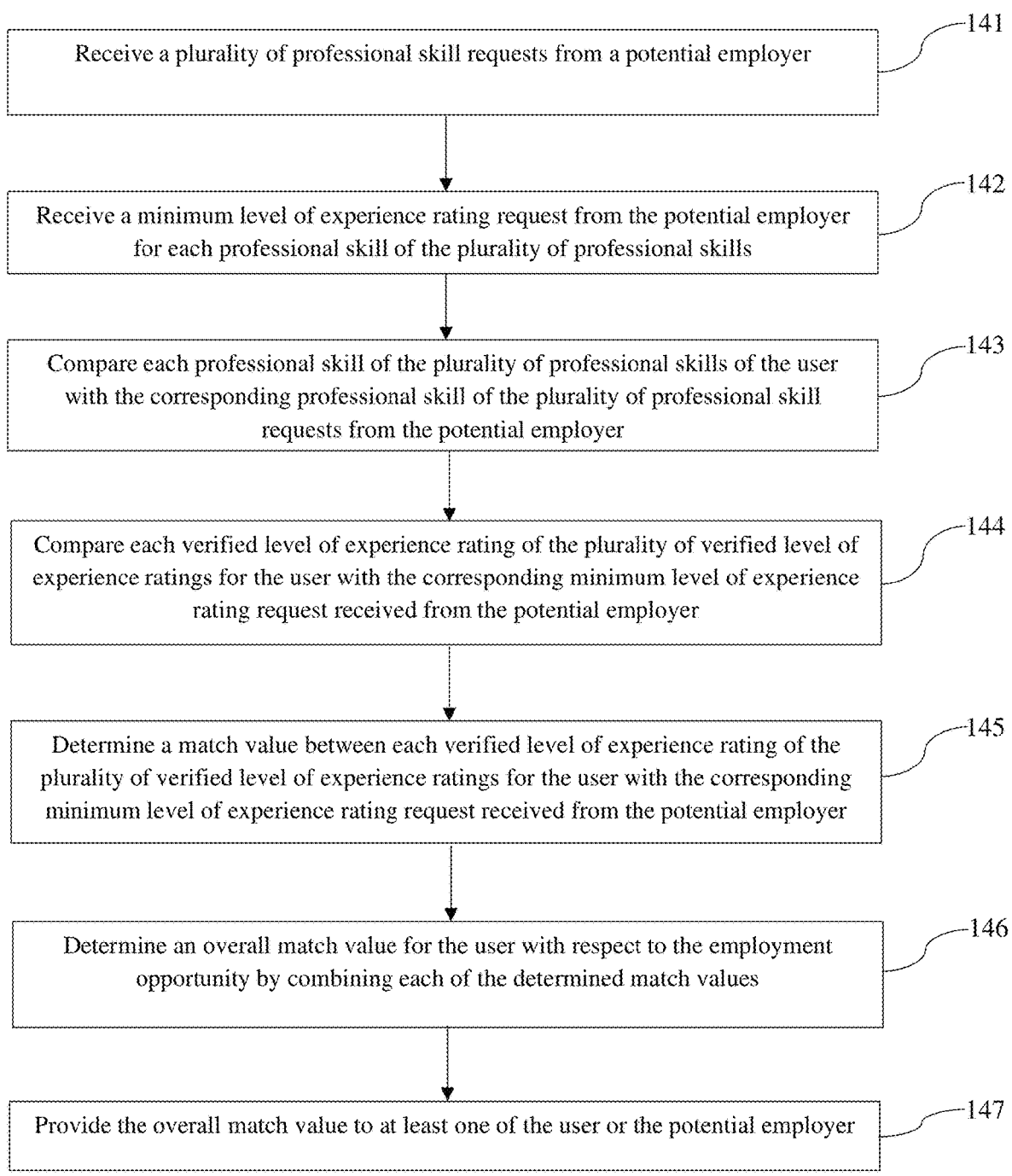

Receive a plurality of professional skill requests from a potential employer ⟋141

Receive a minimum level of experience rating request from the potential employer for each professional skill of the plurality of professional skills ⟋142

Compare each professional skill of the plurality of professional skills of the user with the corresponding professional skill of the plurality of professional skill requests from the potential employer ⟋143

Compare each verified level of experience rating of the plurality of verified level of experience ratings for the user with the corresponding minimum level of experience rating request received from the potential employer ⟋144

Determine a match value between each verified level of experience rating of the plurality of verified level of experience ratings for the user with the corresponding minimum level of experience rating request received from the potential employer ⟋145

Determine an overall match value for the user with respect to the employment opportunity by combining each of the determined match values ⟋146

Provide the overall match value to at least one of the user or the potential employer ⟋147

FIG. 15

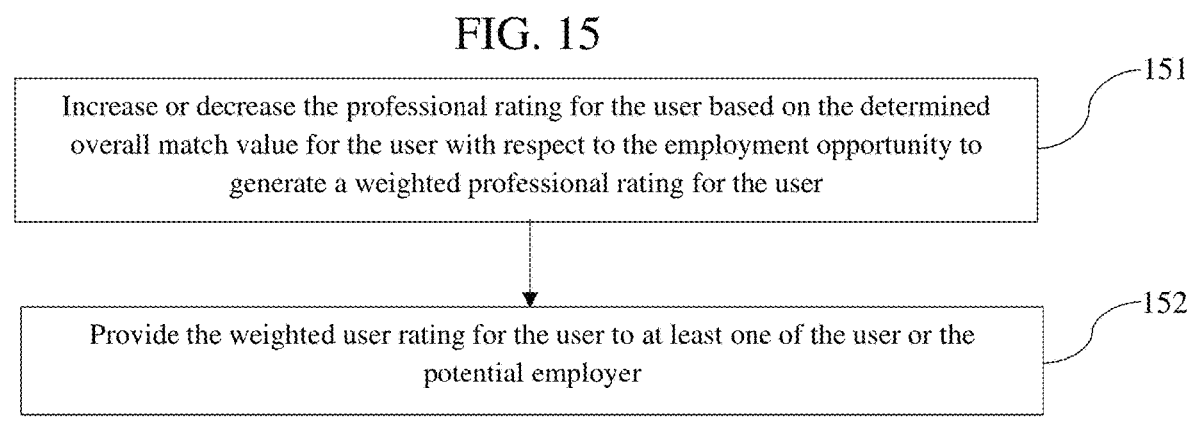

Increase or decrease the professional rating for the user based on the determined overall match value for the user with respect to the employment opportunity to generate a weighted professional rating for the user — 151

Provide the weighted user rating for the user to at least one of the user or the potential employer — 152

FIG. 16

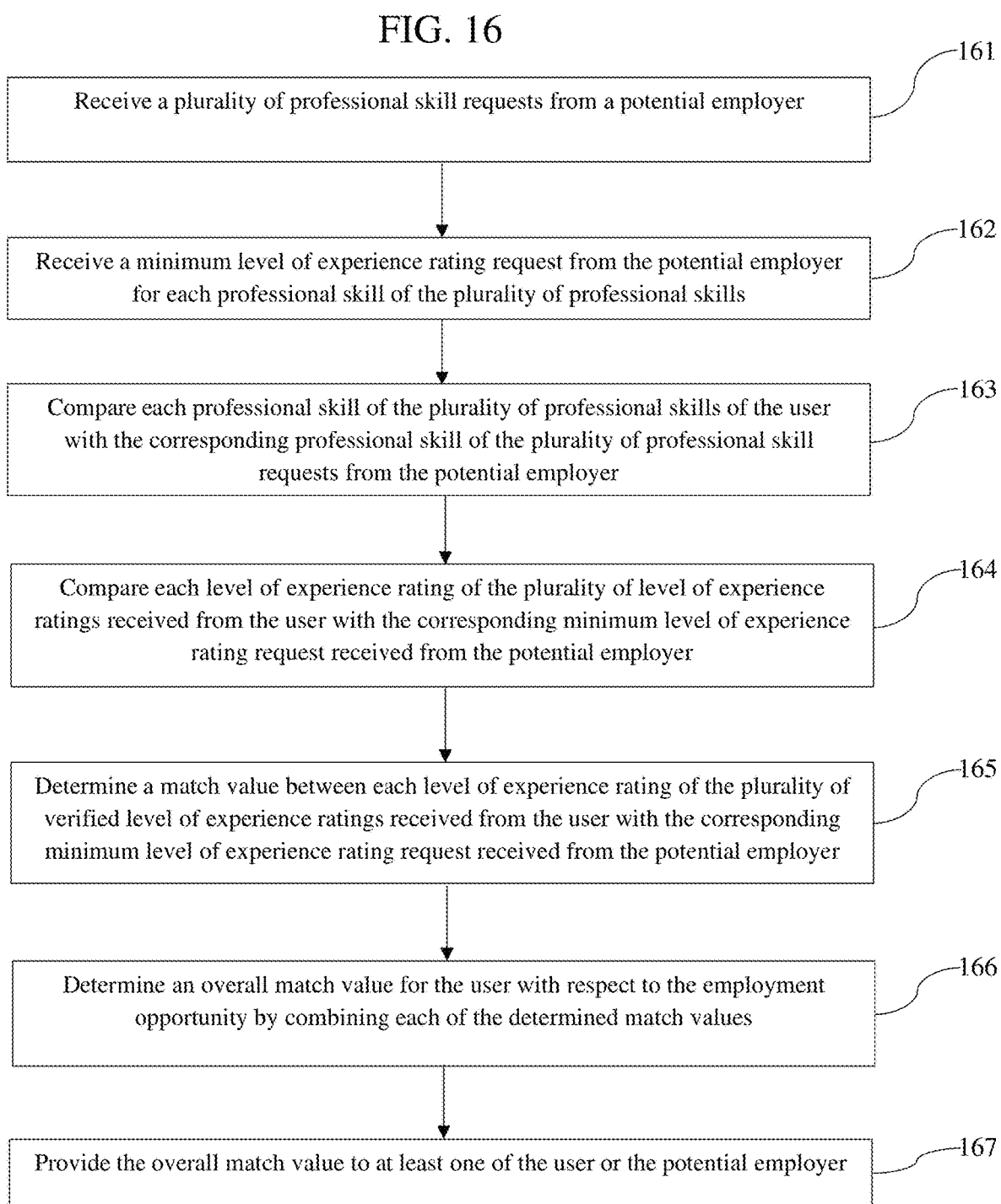

Receive a plurality of professional skill requests from a potential employer ⟋161

Receive a minimum level of experience rating request from the potential employer for each professional skill of the plurality of professional skills ⟋162

Compare each professional skill of the plurality of professional skills of the user with the corresponding professional skill of the plurality of professional skill requests from the potential employer ⟋163

Compare each level of experience rating of the plurality of level of experience ratings received from the user with the corresponding minimum level of experience rating request received from the potential employer ⟋164

Determine a match value between each level of experience rating of the plurality of verified level of experience ratings received from the user with the corresponding minimum level of experience rating request received from the potential employer ⟋165

Determine an overall match value for the user with respect to the employment opportunity by combining each of the determined match values ⟋166

Provide the overall match value to at least one of the user or the potential employer ⟋167

FIG. 18

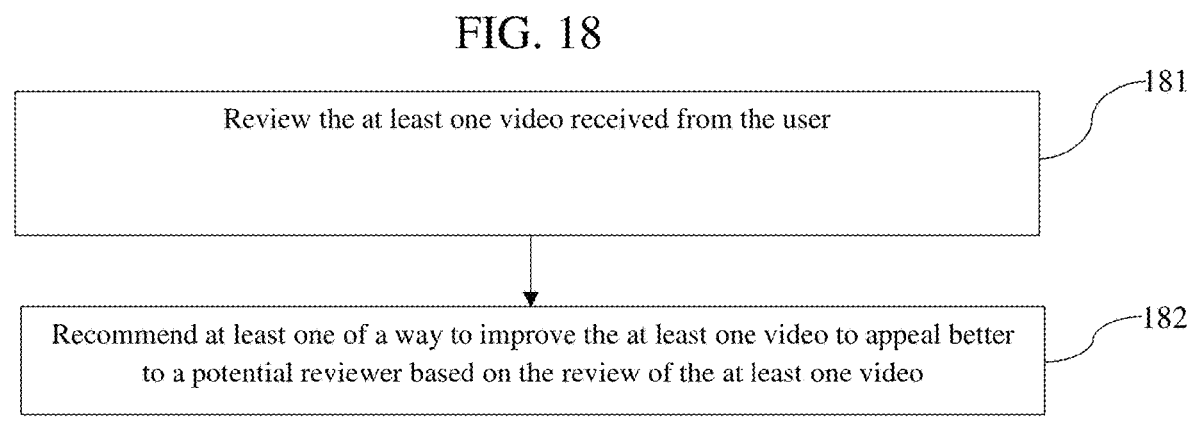

Review the at least one video received from the user    ⌐181

Recommend at least one of a way to improve the at least one video to appeal better to a potential reviewer based on the review of the at least one video    ⌐182

SYSTEM AND METHOD OF CULTIVATING A DIGITAL PROFILE

CROSS-REFERENCE TO RELATED APPLICATION

The present U.S. Non-Provisional Patent Application claims priority to U.S. Provisional Patent Application No. 63/632,823, filed on Apr. 11, 2024, the entire contents of which are incorporated by reference herein.

FIELD

The present disclosure relates to a digital profile and, more particularly, to a system and method of cultivating a personal digital profile for a user.

BACKGROUND

A conventional resume may include general information about a person, such as contact information, employment history, and a general description of a person's skill set. For example, each of the contact information, employment history, and the general description of the person's skill set may be presented in a neutrally written, and entirely text-based format without any additional opportunities for a person to create a more nuanced impression of who they are and what sorts of skills they possess.

Therefore, the usefulness of traditional resumes to create a holistic understanding of an individual is highly limited. There is, therefore, an ongoing need for an improved platform to deliver a better understanding of a person, and their professional background. That is, there is an ongoing need for a platform that provides an individual with greater opportunities to present their professional experience and to describe personal characteristics in a more comprehensive manner.

Such a platform would be highly useful to reviewers, such as employers seeking to hire potential employees.

SUMMARY

Provided in accordance with aspects of the present disclosure is a computer-implemented method of cultivating a digital profile. The method includes receiving personal contact information for a user. At least one video is received from the user. The video includes information about the professional experience of the user. A summary statement about the professional experience of the user is received from the user. A website or social media link for the user is received. A detailed description of the professional experience of the user is received from the user. A list of a number of professional skills of the user is received from the user. A level of experience rating is received from the user for each of the professional skills of the user. A professional rating is generated for the user based on the professional skills of the user and the level of experience rating received from the user for each of the professional skills of the user. A personal digital profile is compiled for the user. The personal digital profile includes the personal contact information for the user, the video, the summary statement, the website or social media link, the detailed description, the list of the professional skills, the level of experience for each of the professional skills of the user, and the generated professional rating for the user. The personal digital profile for the user is configured to be transmitted to a potential reviewer.

In an aspect of the present disclosure, multiple videos are received from the user for inclusion in the personal digital profile.

In an aspect of the present disclosure, the videos are different lengths from each other.

In an aspect of the present disclosure, the method includes receiving at least one professional endorsement for the user from another user. The professional rating for the user is modified based on the received professional endorsement(s) for the user received from the other user.

In an aspect of the present disclosure, the method includes receiving at least one personal endorsement for the user from another user. The professional rating for the user is modified based on the received personal endorsement(s) for the user received from the other user.

In an aspect of the present disclosure, the method includes receiving at least one professional endorsement for the user from a third party source. The professional rating for the user is modified based on the received professional endorsement (s) for the user received from the third party source.

In an aspect of the present disclosure, the method includes receiving a level of educational attainment for the user. A name of at least one professional degree or professional certificate attained by the user is received. The personal digital profile for the user is compiled to include the level of educational attainment for the user and the name of the professional degree(s) or the professional certificate(s) attained by the user.

In an aspect of the present disclosure, the method includes receiving at least one link to a professional work product of the user. The professional work product relates to at least one professional skill of the user. The personal digital profile for the user is compiled to include the link(s) to the professional work product of the user.

In an aspect of the present disclosure, the level of educational attainment for the user is verified from a third party source.

In an aspect of the present disclosure, the method includes verifying each level of experience rating received from the user for each professional skill of the user by communicating with a third party. A number of verified level of experience ratings for the user are generated. A visual indicator for each verified level of experience rating for the user is received.

In an aspect of the present disclosure, the method includes receiving a number of professional skill requests from a potential employer. A minimum level of experience rating request is received from the potential employer for each professional skill requested. Each professional skill of the user is compared with the corresponding professional skill requested from the potential employer. Each verified level of experience rating for the user is compared with the corresponding minimum level of experience rating request received from the potential employer. A match value is determined between each verified level of experience rating for the user with the corresponding minimum level of experience rating request received from the potential employer. An overall match value for the user with respect to the employment opportunity is determined by combining each of the determined match values. The overall match value is provided to at least one of the user or the potential employer.

In an aspect of the present disclosure, the method includes increasing or decreasing the professional rating for the user based on the determined overall match value for the user with respect to the employment opportunity to generate a weighted professional rating for the user. The weighted user rating for the user is provided to at least one of the user or the potential employer.

In an aspect of the present disclosure, the method includes receiving a number of professional skill requests from a potential employer. A minimum level of experience rating request is received from the potential employer for each professional skill. Each professional skill of the user is compared with the corresponding professional skill requested from the potential employer. Each level of experience rating received from the user is compared with the corresponding minimum level of experience rating request received from the potential employer. A match value is determined between each level of experience rating received from the user and the corresponding minimum level of experience rating request received from the potential employer. An overall match value for the user with respect to the employment opportunity is determined by combining each of the determined match values. The overall match value is provided to at least one of the user or the potential employer.

In an aspect of the present disclosure, the method includes generating a non-fungible token (NFT) associated with the personal digital profile. The authenticity of the NFT associated with the personal digital profile is determined by communicating with a blockchain. Verifying the authenticity of the NFT associated with the personal digital profile is used to verify the authenticity of the personal digital profile.

In an aspect of the present disclosure, the method includes identifying at least one additional professional rating for the user provided by a third party source. The personal digital profile for the user is compiled to include the additional professional rating(s) for the user.

In an aspect of the present disclosure, the method includes reviewing the video(s) received from the user. At least one of a way to improve the video(s) to appeal better to a potential reviewer is recommended based on the review of the video(s).

In an aspect of the present disclosure, the method includes reviewing the video(s) received from the user. The information about the professional experience of the user included in the video is evaluated. The accuracy of the professional experience of the user included in the video is assessed. A report of the assessed accuracy of the professional experience of the user included in the video is transmitted.

In an aspect of the present disclosure, the method includes receiving information regarding the volunteer or charitable activities performed by the user. A charitable rating for the user is generated based on the received information regarding the volunteer or charitable activities performed by the user. The personal digital profile for the user is compiled to include the charitable rating for the user.

In an aspect of the present disclosure, the method includes receiving at least one video endorsement for the user. The personal digital profile for the user is compiled to include the video endorsement(s) for the user.

BRIEF DESCRIPTION OF THE DRAWINGS

Various aspects and features of the present disclosure are described hereinbelow with reference to the drawings, wherein:

FIG. 1 illustrates an exemplary personal digital profile according to aspects of the present disclosure;

FIG. 7 is a flow chart of a computer-implemented algorithm for generating a personal digital profile for a user;

FIG. 8 is a flow chart of a computer-implemented algorithm employable in generating a personal digital profile for a user;

FIG. 9 is a flow chart of a computer-implemented algorithm employable in generating a personal digital profile for a user;

FIG. 10 is a flow chart of a computer-implemented algorithm employable in generating a personal digital profile for a user;

FIG. 11 is a flow chart of a computer-implemented algorithm employable in generating a personal digital profile for a user;

FIG. 12 is a flow chart of a computer-implemented algorithm employable in generating a personal digital profile for a user;

FIG. 14 is a flow chart of a computer-implemented algorithm employable in generating a personal digital profile for a user;

FIG. 15 is a flow chart of a computer-implemented algorithm employable in generating a personal digital profile for a user;

FIG. 16 is a flow chart of a computer-implemented algorithm employable in generating a personal digital profile for a user;

FIG. 18 is a flow chart of a computer-implemented algorithm employable in generating a personal digital profile for a user;

DETAILED DESCRIPTION

Figure 2:
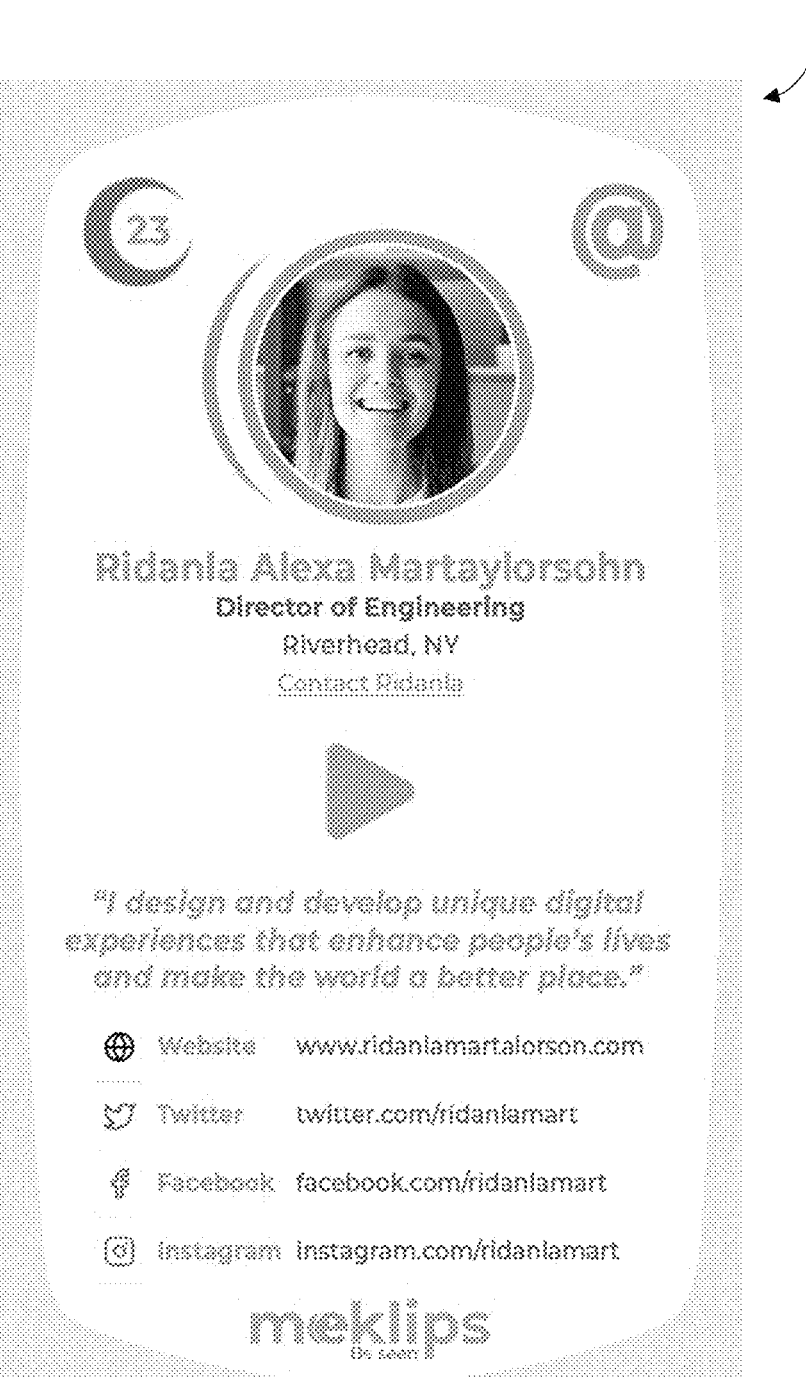
FIG. 2 illustrates an exemplary digital business card according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

A personal digital profile (see, e.g., digital profile 10 in FIG. 1, or digital profile 40 in FIG. 4) is described herein. While the personal digital profile (e.g. 10 and/or 40) may be employed to facilitate hiring between a user (employee) and an employee, the personal digital profile (e.g. 10 and/or 40) can also be employed for other functions. For example, the personal digital profile (e.g. 10 and/or 40) can be tailored for use in a dating context, such as on a dating platform. The personal digital profile (e.g. 10 and/or 40) can also be employed for school or college applications. The personal digital profile (e.g. 10 and/or 40) can also be used for networking or business development functions. The personal digital profile (e.g. 10 and/or 40) can be presented in various different forms, such as in the form of a digital business card (see, e.g., digital business card 20 in FIG. 2, or digital business card 30 in FIG. 3).

Referring particularly to FIGS. 1 to 7, a computer-implemented method of cultivating a digital profile (see, e.g., digital profile 10 in FIG. 1, or digital profile 40 in FIG. 4) includes receiving personal contact information for a user 71. At least one video is received from the user 72. The video includes information about the professional experience of the user. A summary statement about the professional experience of the user is received from the user 73. A website or social media link for the user is received 74. A detailed description of the professional experience of the user is received from the user 75. A list of a number of professional skills of the user is received from the user 76. A level of experience rating is received from the user for each of the professional skills of the user 77. A professional rating is generated for the user based on the professional skills of the user and the level of experience rating received from the user for each of the professional skills of the user 78. A personal digital profile (e.g. 10 and/or 40) is compiled for the user. The personal digital profile (e.g. 10 and/or 40) includes the personal contact information for the user, the video, the summary statement, the website or social media link, the detailed description, the list of the professional skills, the level of experience for each of the professional skills of the user, and the generated professional rating for the user 79. The personal digital profile (e.g. 10 and/or 40) for the user is configured to be transmitted to a potential reviewer.

Figure 4:
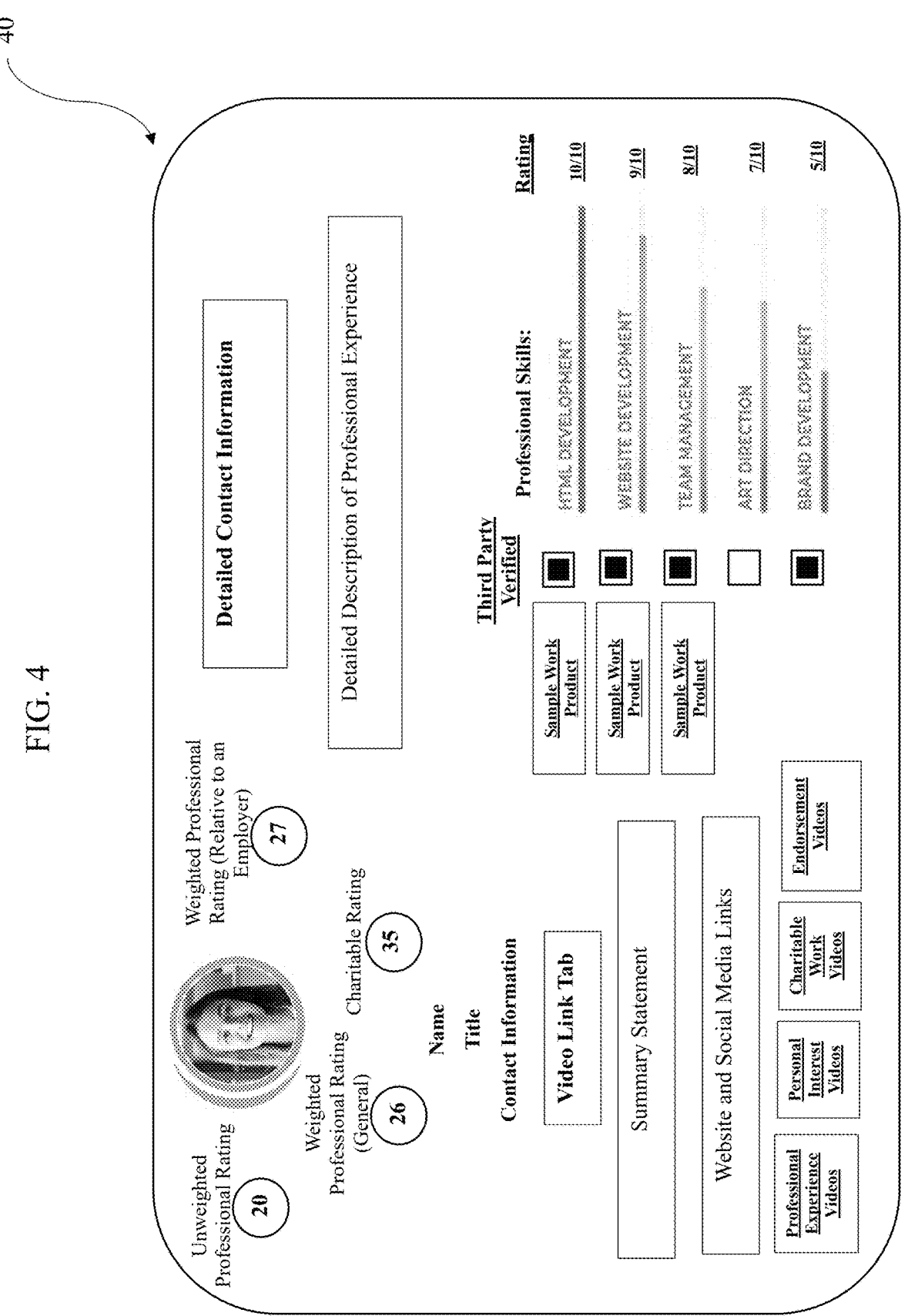
FIG. 4 illustrates an exemplary personal digital profile according to aspects of the present disclosure.

In an aspect of the present disclosure, multiple videos are received from the user for inclusion in the personal digital profile (see, e.g., digital profile 10 in FIG. 1, or digital profile 40 in FIG. 4). The videos may be different lengths from each other. For example, a number of different videos may be recorded by a user and made available through the personal digital profile (e.g. 10 and/or 40).

Figure 3:
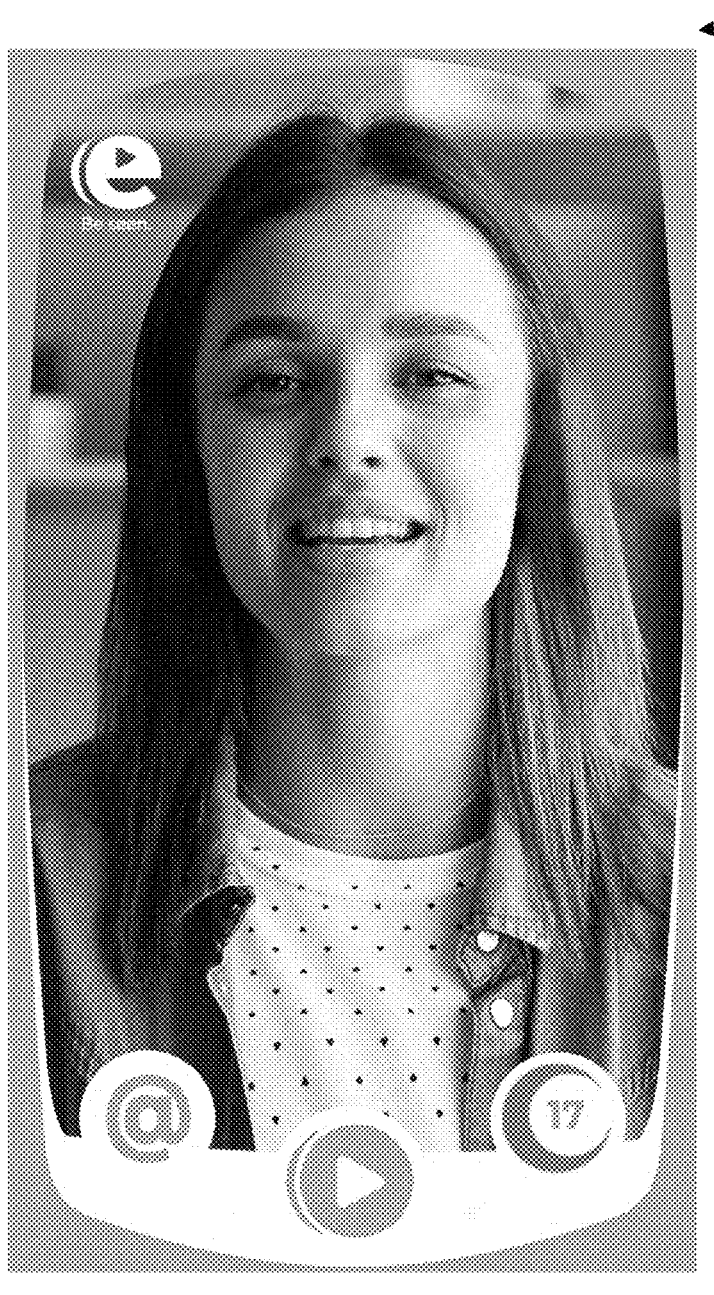
FIG. 3 illustrates another exemplary digital business card according to aspects of the present disclosure.

Referring particularly to FIGS. 2 and 3, the personal digital profile (see, e.g., digital profile 10 in FIG. 1, or digital profile 40 in FIG. 4) can be employed to generate a digital business card (see, e.g., digital business card 20 in FIG. 2, or digital business card 30 in FIG. 3). The digital business card (e.g. 20 and/or 30) provides a more concise presentation of a user, such as contact information, a job title for the user, a link to any videos of the user as described herein, a summary statement of the user's professional experience, and a number of links to content related to the user such as website, social media pages, links to work product, and/or any of the user ratings described herein. For example, the digital business card (e.g. 20 and/or 30) may include any of the professional ratings for the user (e.g., the unweighted or general professional rating for the user), the weighted professional rating (e.g., which would potentially vary in rating based on the reviewer viewing the digital business card (e.g. 20 and/or 30)), and/or the charitable rating for the user (see, e.g., FIG. 4 illustrating three exemplary ratings for the user).

Figure 5:
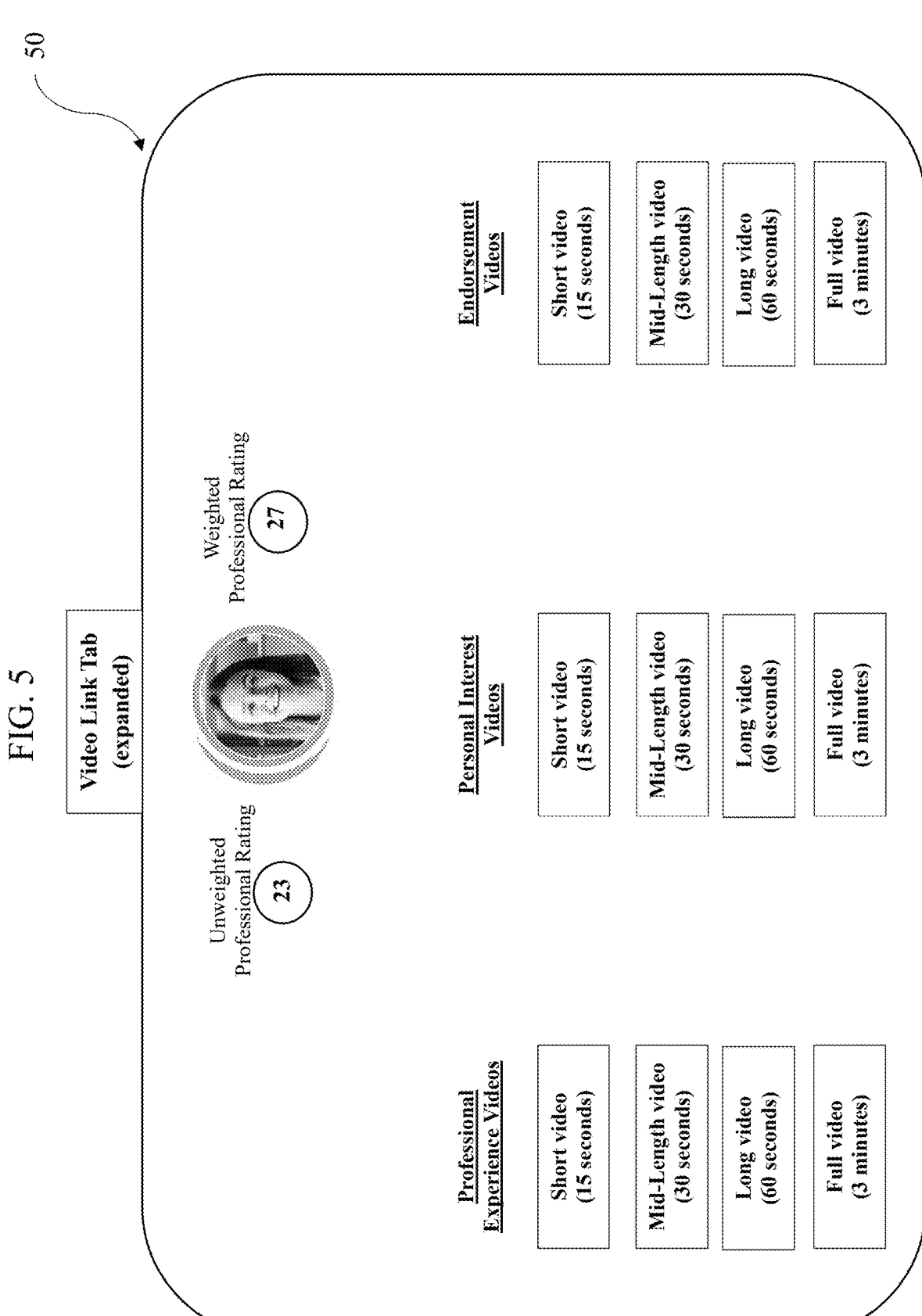
FIG. 5 illustrates an exemplary video link tab employable by the personal digital profiles or the digital business cards of FIGS. 1-4.
Figure 6:
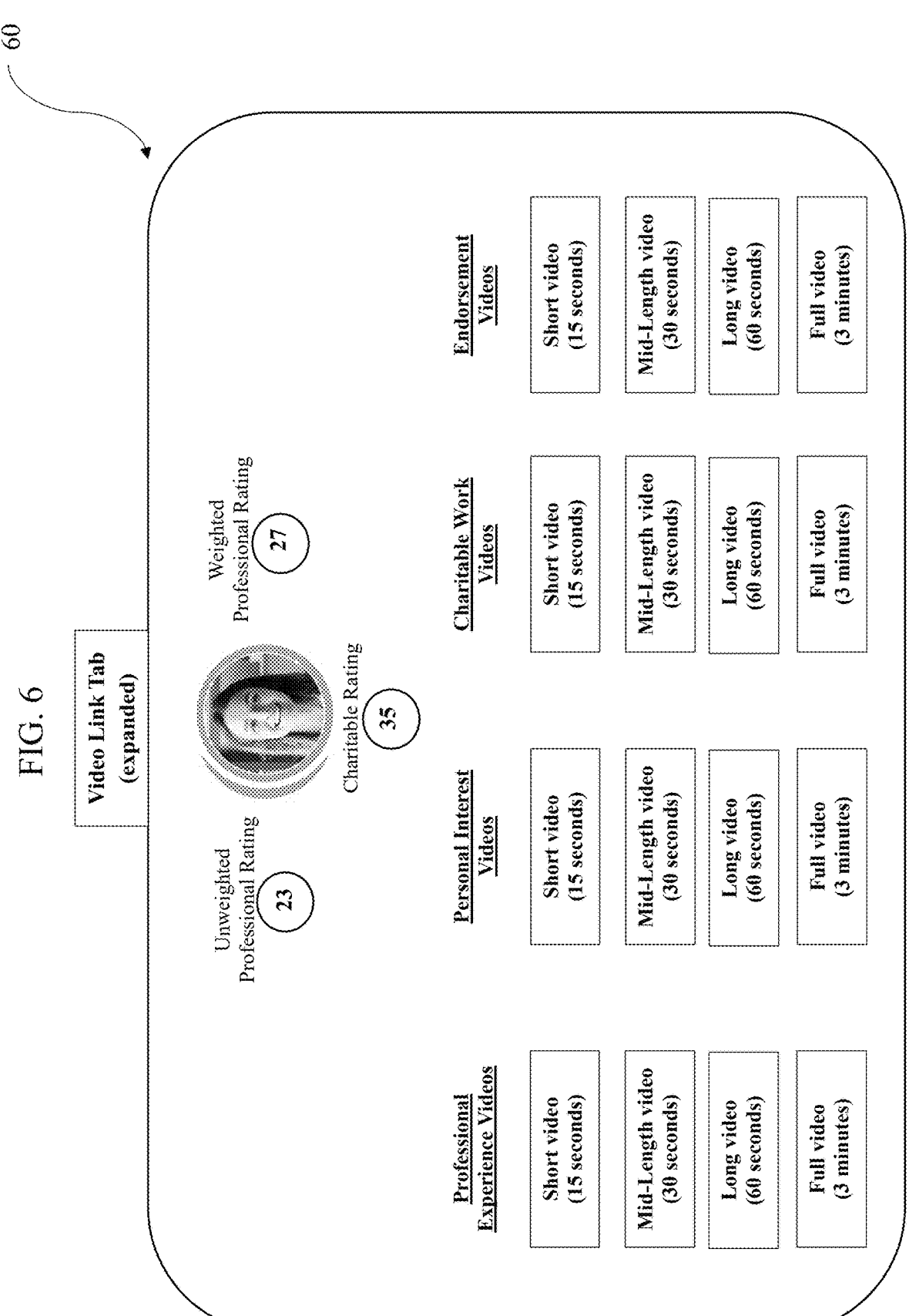
FIG. 6 illustrates another exemplary video link tab including a charitable rating for a user employable by the personal digital profiles or the digital business cards of FIGS. 1-4.

Referring to FIGS. 5 and 6, the personal digital profile (see, e.g., digital profile 10 in FIG. 1, or digital profile 40 in FIG. 4) may connect with an expanded video tab (see, e.g., video link tab 50 in FIG. 5, or video link tab 60 in FIG. 6). A more limited number of videos (e.g., a primary video selected by the user) might be executable directly within or from the personal digital profile (e.g. 10 and/or 40) or digital business cards (see, e.g., digital business card 20 in FIG. 2, or digital business card 30 in FIG. 3). However, the expanded video tab (e.g. 50 and/or 60) may include an array of videos, such as videos of different lengths (e.g., videos ranging from 10-15 seconds up to multiple minutes). As an example, a potential employer strongly considering a user having generated the personal digital profile (e.g. 10 and/or 40) might be willing to view a video of several minutes in length, or even multiple videos of several minutes in length to develop a more comprehensive understanding of the user having created the personal digital profile (e.g. 10 and/or 40). The expanded video tab (e.g. 50 and/or 60) may include various batches of videos, such as professional experience videos, personal interest videos, charitable activity videos, and/or endorsement videos.

In particular, FIG. 6 illustrates another exemplary video link tab 60 including a charitable rating for a user employable by the personal digital profiles (see, e.g., digital profile 10 in FIG. 1, or digital profile 40 in FIG. 4) or the digital business cards (see, e.g., digital business card 20 in FIG. 2, or digital business card 30 in FIG. 3) of FIGS. 1-4. That is, when a user has engaged in charitable work, such as work for a nonprofit, donating time to a charitable cause, etc. the user's profile may be generated to include a charitable rating for the user (as described in more detail below), and the user may record videos of varying lengths to discuss the charitable work. In the event that a user has not engaged in charitable work, the charitable rating and the charitable work videos features of the personal digital profile (e.g. 10 and/or 40) can be omitted.

The video tabs described with reference to FIGS. 5 and 6 can be accessible by clicking on the video link in the digital business cards (see, e.g., digital business card 20 in FIG. 2, or digital business card 30 in FIG. 3) described herein (see, e.g., FIGS. 2 and 3 illustrating exemplary digital business cards).

Referring particularly to FIG. 8, the method includes receiving at least one professional endorsement for the user from another user 81. The professional rating for the user is modified based on the received professional endorsement(s) for the user received from the other user 82. That is, the professional rating for the user (e.g., the unweighted professional rating) might be increased for a user having at least one endorsement. As an example, a formula may be applied to increasing a user's unweighted professional rating, as follows. A single endorsement may increase a weighted multiplier from 1 to 1.1, and each additional endorsement might increase the weighted multiplier by 0.1, such that a user receiving 3 positive endorsements would receive a weighted multiplier of 1.3. As an example (see, e.g., FIG. 4), a user might have an unweighted general professional rating of 20, and a weighted general professional rating of 26. As discussed in more detail below, the user might also have a charitable rating of 35 based on chartable work, and a weighted professional rating of 27 if the user is found to be a relatively good match with a potential employer.

Referring particularly to FIG. 9, the method includes receiving at least one personal endorsement for the user from another user 91. The professional rating for the user is modified based on the received personal endorsement(s) for the user received from the other user 92. A similar formula to that described above for professional endorsements could also be applied to personal endorsements. As an example, a user having 3 personal endorsements and 3 professional endorsements might have an unweighted professional rating of 20 increased to 32 based on a weighted multiplier of 1.6. With respect to all examples of ratings discussed herein, a user has the option of displaying some ratings and omitting others.

Referring particularly to FIG. 10, the method includes receiving at least one professional endorsement for the user from a third party source 101. The professional rating for the user is modified based on the received professional endorsement(s) for the user received from the third party source 102.

Referring to FIG. 11, the method includes receiving a level of educational attainment for the user 111. A name of at least one professional degree or professional certificate attained by the user is received 112. The personal digital profile for the user is compiled to include the level of educational attainment for the user and the name of the professional degree(s) or the professional certificate(s) attained by the user 113.

The level of educational attainment for the user may be verified from a third party source. For example, a university degree may be confirmed by communicating with the university or college issuing the degree. Additionally, a professional certificate can be verified by communicating with the issuing party, such as a private agency, state, agency, federal agency, or the like.

Referring to FIG. 12, the method includes receiving at least one link to a professional work product of the user 121. The professional work product relates to at least one professional skill of the user. The personal digital profile for the user is compiled to include the link(s) to the professional work product of the user 122.

Figure 13:
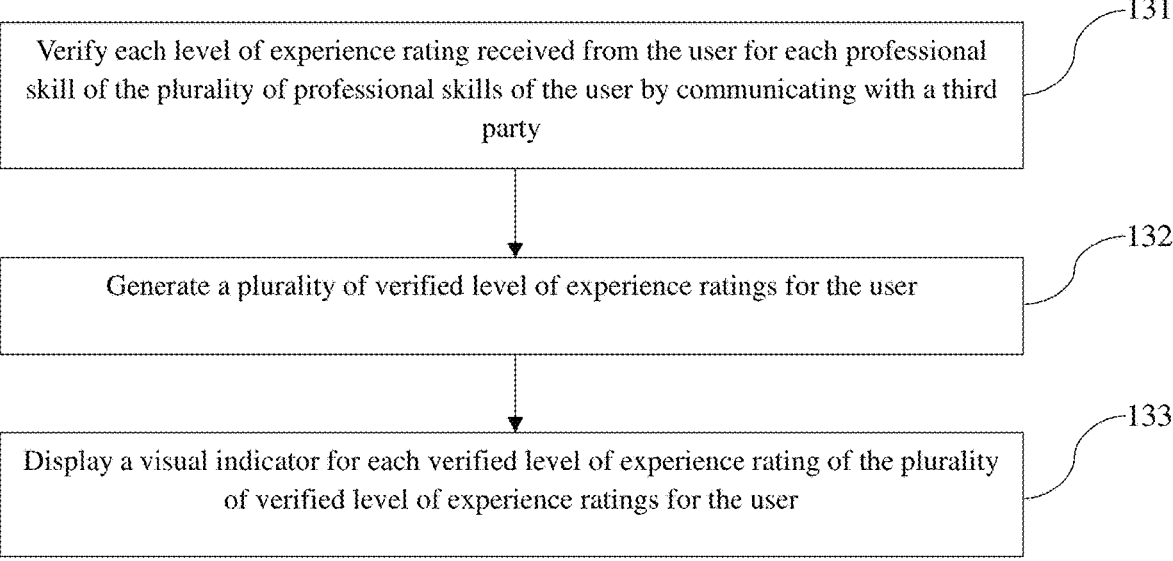
FIG. 13 is a flow chart of a computer-implemented algorithm employable in generating a personal digital profile for a user.

Referring to FIG. 13, the method includes verifying each level of experience rating received from the user for each professional skill of the user by communicating with a third party 131. A number of verified level of experience ratings for the user are generated 132. A visual indicator for each verified level of experience rating for the user is received 133.

Referring to FIG. 14, the method includes receiving a number of professional skill requests from a potential employer 141. A minimum level of experience rating request is received from the potential employer for each professional skill requested 142. Each professional skill of the user is compared with the corresponding professional skill requested from the potential employer 143. Each verified level of experience rating for the user is compared with the corresponding minimum level of experience rating request received from the potential employer 144. A match value is determined between each verified level of experience rating for the user with the corresponding minimum level of experience rating request received from the potential employer 145. An overall match value for the user with respect to the employment opportunity is determined by combining each of the determined match values 146. The overall match value is provided to at least one of the user or the potential employer 147. A more detailed discussion of comparing requested professional skills and the professional skills of a user/potential employee or applicant is described below with reference to FIGS. 24 and 25.

Referring to FIG. 15, the method includes increasing or decreasing the professional rating for the user based on the determined overall match value for the user with respect to the employment opportunity to generate a weighted professional rating for the user 151. The weighted user rating for the user is provided to at least one of the user or the potential employer 152.

Referring to FIG. 16, the method includes receiving a number of professional skill requests from a potential employer 161. A minimum level of experience rating request is received from the potential employer for each professional skill 162. Each professional skill of the user is compared with the corresponding professional skill requested from the potential employer 163. Each level of experience rating received from the user is compared with the corresponding minimum level of experience rating request received from the potential employer 164. A match value is determined between each level of experience rating received from the user and the corresponding minimum level of experience rating request received from the potential employer 165. An overall match value for the user with respect to the employment opportunity is determined by combining each of the determined match values 166. The overall match value is provided to at least one of the user or the potential employer 167.

Figure 17:
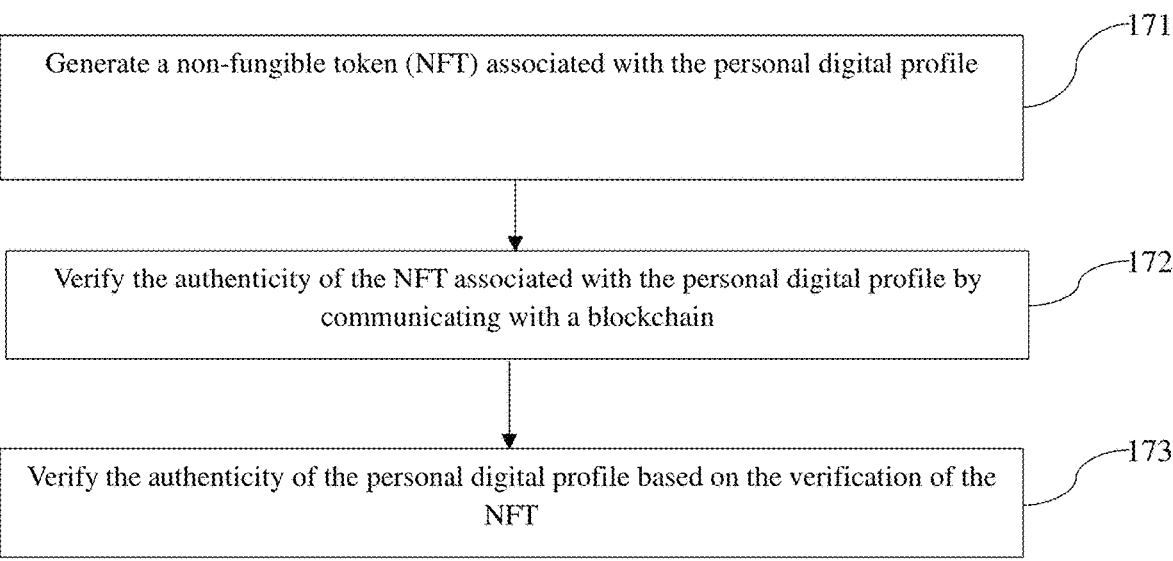
FIG. 17 is a flow chart of a computer-implemented algorithm employable in generating a personal digital profile for a user.

Referring to FIG. 17, the method includes generating a non-fungible token (NFT) associated with the personal digital profile 171. The authenticity of the NFT associated with the personal digital profile is determined by communicating with a blockchain 172. Verifying the authenticity of the NFT associated with the personal digital profile is used to verify the authenticity of the personal digital profile 173.

The method may include identifying at least one additional professional rating for the user provided by a third party source. The personal digital profile for the user is compiled to include the additional professional rating(s) for the user.

Referring to FIG. 18, the method includes reviewing the video(s) received from the user 181. At least one of a way to improve the video(s) to appeal better to a potential reviewer is recommended based on the review of the video(s) 182. A machine learning model 2200 including an artificial neural network 2202 is described in more detail below with reference to FIGS. 22 and 23.

Figure 19:
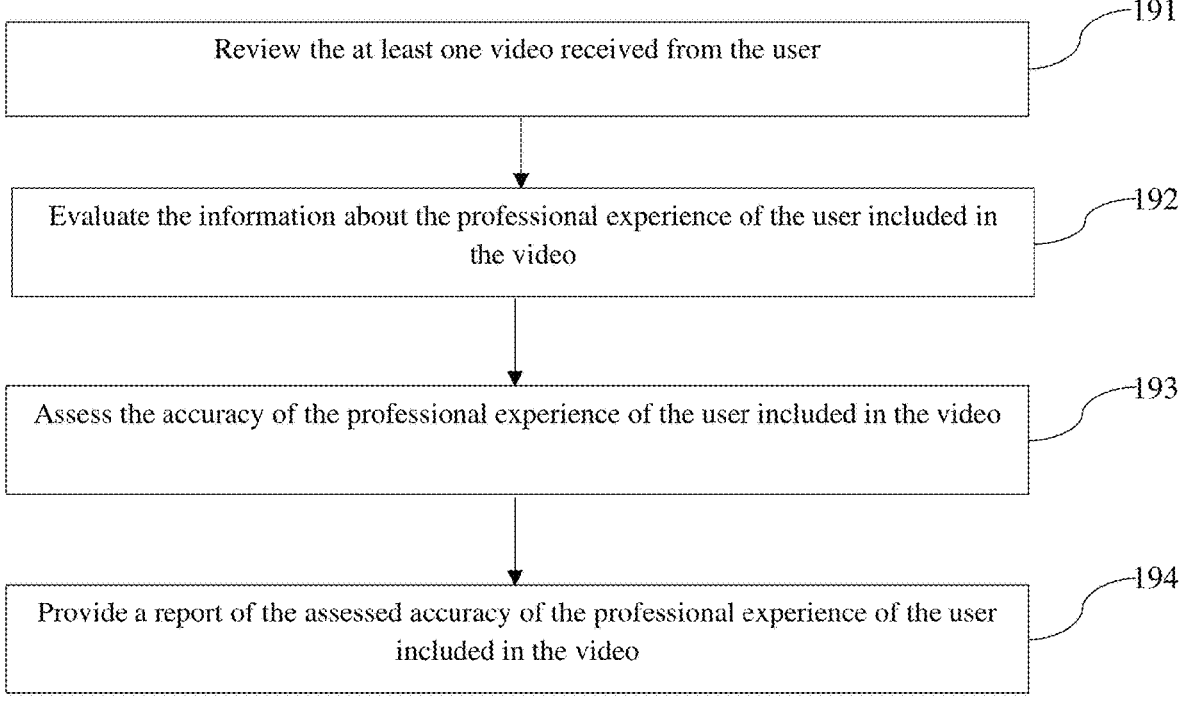
FIG. 19 is a flow chart of a computer-implemented algorithm employable in generating a personal digital profile for a user.

Referring to FIG. 19, the method of reviewing the video(s) provided by the user 191 includes reviewing the video(s) received from the user by employing a machine learning model 2200, as described herein. The information about the professional experience of the user included in the video is evaluated 192. The accuracy of the professional experience of the user included in the video is assessed 193. A report of the assessed accuracy of the professional experience of the user included in the video is transmitted 194.

Figure 20:
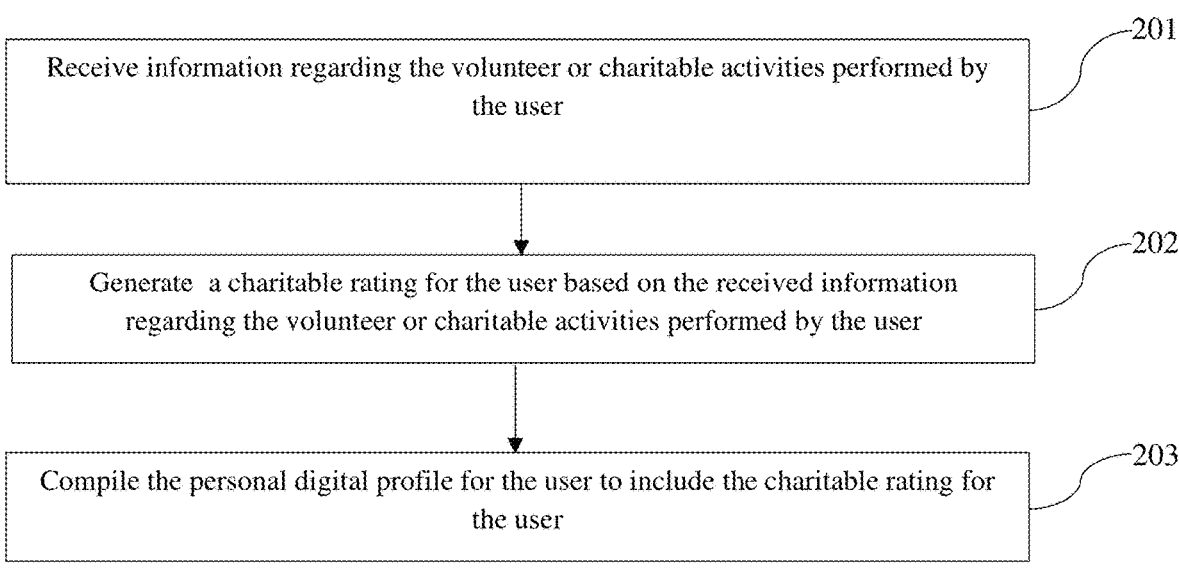
FIG. 20 is a flow chart of a computer-implemented algorithm employable in generating a personal digital profile for a user.

Referring to FIG. 20, the method includes receiving information regarding the volunteer or charitable activities performed by the user 201. A charitable rating for the user is generated based on the received information regarding the volunteer or charitable activities performed by the user 202. The personal digital profile (see, e.g., digital profile 10 in FIG. 1, or digital profile 40 in FIG. 4) for the user is compiled to include the charitable rating for the user 203.

In an aspect of the present disclosure, the method includes receiving at least one video endorsement for the user. The personal digital profile (see, e.g., digital profile 10 in FIG. 1, or digital profile 40 in FIG. 4) for the user is compiled to include the video endorsement(s) for the user. As an example, the video endorsement for the user may include any of a personal reference for the user, an endorsement from a past employer, an endorsement from someone knowledgeable of a particular professional skill for the user (e.g., an ability to write in a particular programming language may be highlighted by someone knowledgeable of a user's skill level in this particular area), an endorsement from a prior manager, or an endorsement from a prior co-worker of the user.

Figure 21:
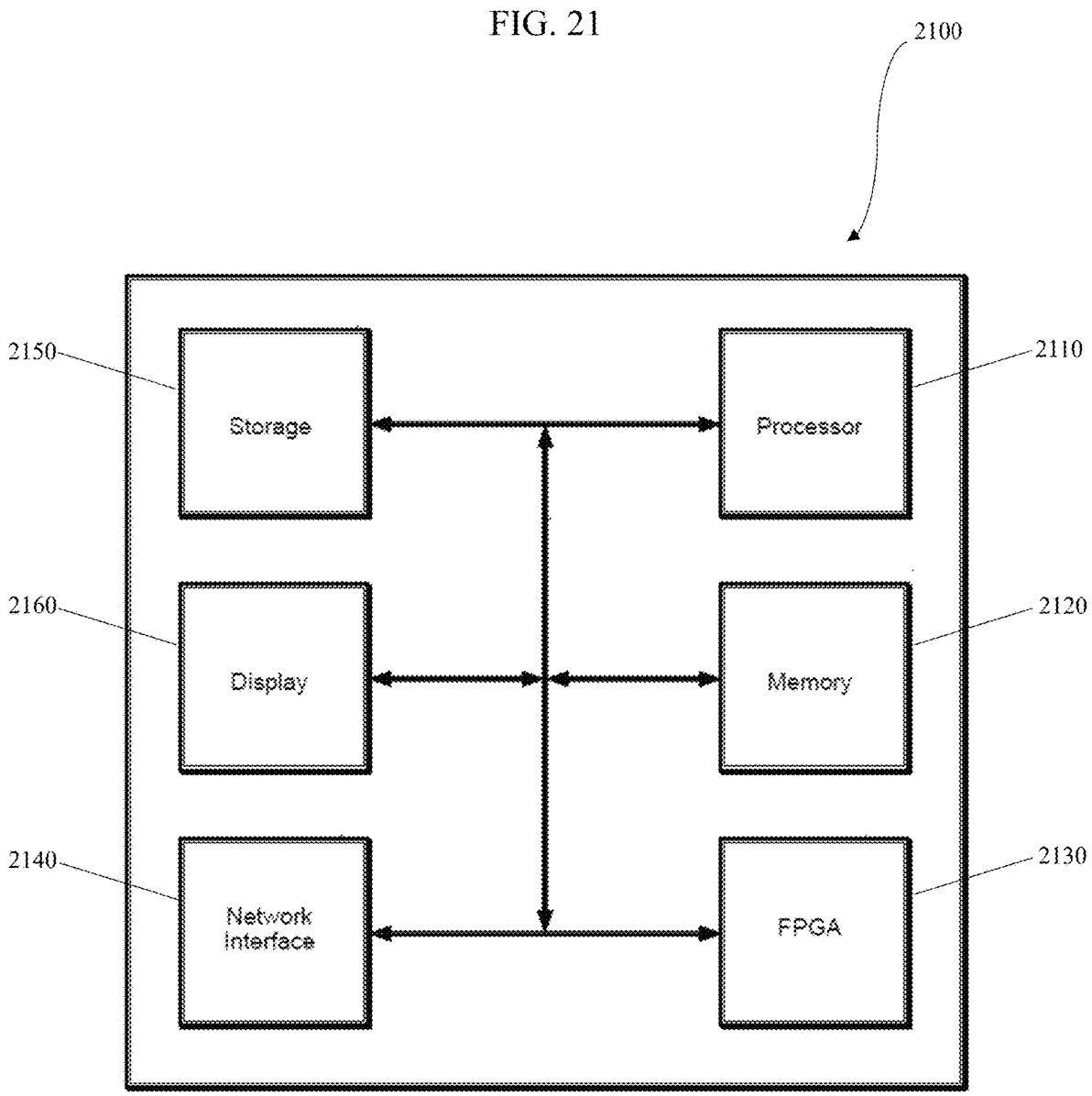
FIG. 21 is a block diagram of an exemplary computer for implementing the methods described herein according to aspects of the present disclosure.

Referring particularly to FIG. 21, a general-purpose computer 2100 is described. The general-purpose computer 2100 can be employed to perform the various methods and algorithms described herein. The computer may include a processor 2110 connected to a computer-readable storage medium or a memory 2120 which may be a volatile type memory, e.g., RAM, or a non-volatile type memory, e.g., flash media, disk media, etc. The processor 2110 may be another type of processor such as, without limitation, a digital signal processor, a microprocessor, an ASIC, a graphics processing unit (GPU), field-programmable gate array (FPGA) 2130, or a central processing unit (CPU).

In some aspects of the disclosure, the memory 2120 can be random access memory, read-only memory, magnetic disk memory, solid state memory, optical disc memory, and/or another type of memory. The memory 2120 can communicate with the processor 2110 through communication buses of a circuit board and/or through communication cables such as serial ATA cables or other types of cables. The memory 2120 includes computer-readable instructions that are executable by the processor to operate the computer to execute the algorithms described herein. The computer 2100 may include a network interface 2140 to communicate (e.g., through a wired or wireless connection) with other computers or a server. A storage device 2150 may be used for storing data. The computer may include one or more FPGAs 2130. The FPGA 2130 may be used for executing various machine learning algorithms. A display 2160 may be employed to display data processed by the computer 2100.

Generally, the memory 2120 may store computer instructions executable by the processor 2110 to carry out the various functions described herein.

The computer 2100 may employ various artificial intelligence models, such as one or more machine learning models or algorithms (see, e.g., FIGS. 22 and 23, and the more detailed description provided below).

Connections between the various modules, hardware, and other components described herein may be achieved through either wired or wireless connections, such as wireless connections through WiFi, BlueTooth, or other short range wireless communication protocols (e.g., radio frequencies).

Figure 22:
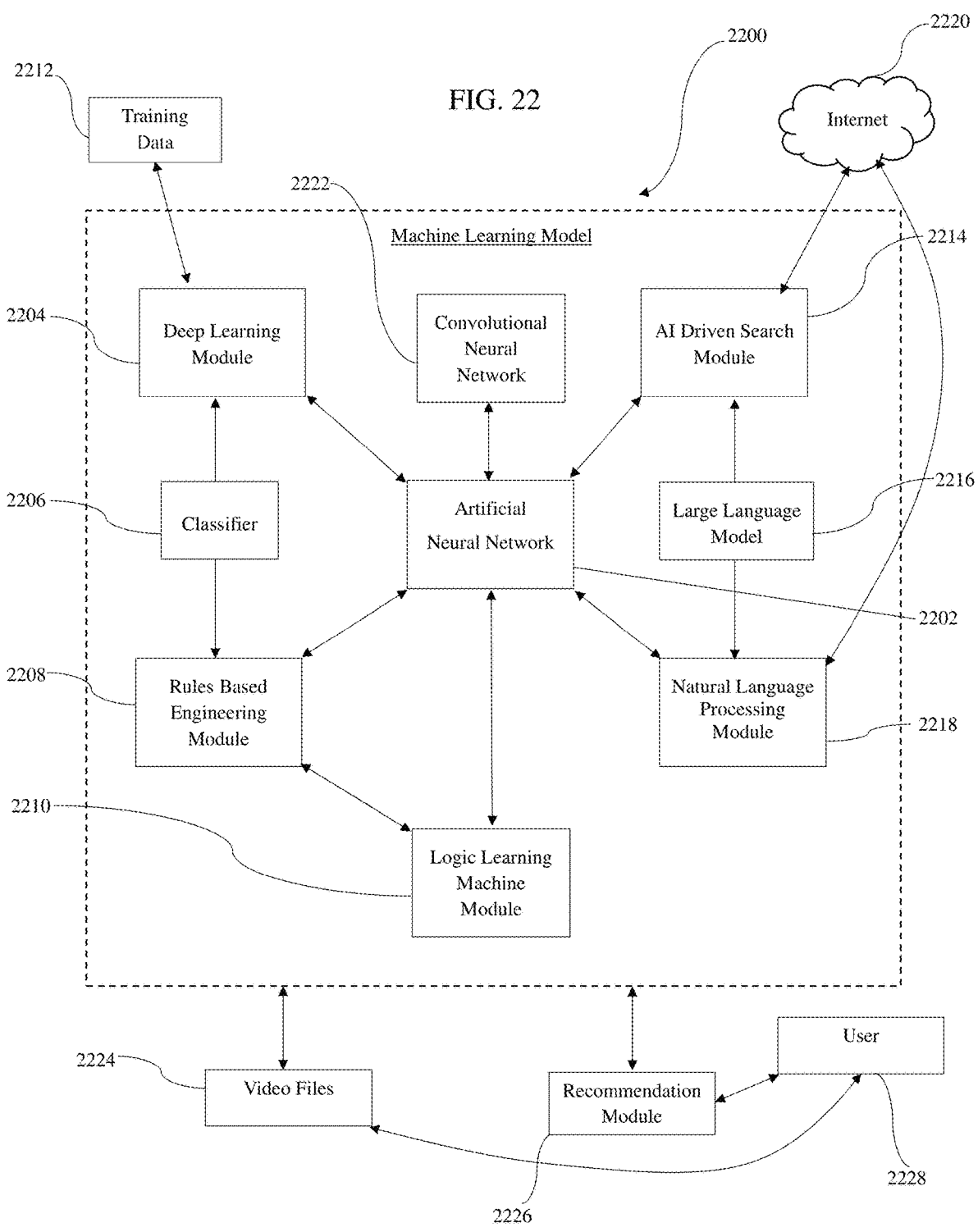
FIG. 22 is a schematic illustration of a machine learning model architecture including an artificial neural network according to aspects of the present disclosure.

FIG. 22 is a schematic illustration of a machine learning model 2200 architecture including an artificial neural network 2202 according to aspects of the present disclosure.

The machine learning model 2200 may include a deep learning module 2204, a classifier 2206, a rules based engineering model 2208, and/or a logic learning machine module 2210, any of which may be iteratively trained using a training data set 2212, such as a training data set stored in a training data set 2212 database.

The machine learning model 2200 may include an AI driven search module 2214, a large language model 2216, and/or a natural language processing module 2218, and of which may be selectively connected to the internet 2220.

The AI driven search module 2214 enhances the user's digital profile (see, e.g., digital profile 10 in FIG. 1, or digital profile 40 in FIG. 4) by dynamically sourcing and integrating external information relevant to the user's professional interests and achievements. The AI driven search module 2214 may filter through material available on the internet 2220 to identify and retrieve up-to-date user 2228 specific information (e.g., user 2228 published articles, studies, publications, and/or professional courses) to keep the user's digital profile current (e.g. 10 and/or 40), comprehensive, and reflective of the user's current professional level. The AI driven search module 2214 may work in conjunction with the natural language processing 2218 and/or the large language model 2216 to refine search queries based on the context and specifics of the user's profile, ensuring that the information added is both pertinent to the user's digital profile (e.g. 10 and/or 40).

The large language model 2216 may serve a role in enhancing the textual components of the digital profiles (see, e.g., digital profile 10 in FIG. 1, or digital profile 40 in FIG. 4). The large language model 2216 can process and interpret natural language, the large language model 2216 may generate comprehensive summaries reflecting a user's professional experiences and competencies, utilizing structured data from other system modules like the classifier's 2206 key achievements or professional qualities. The large language model 2216 can also refine and personalize the textual content of profiles, ensuring they are both engaging and reflective of the user's unique professional identity. Furthermore, it may assist in processing and understanding user 2228 queries or feedback, facilitating a more interactive and responsive user 2228 experience within the digital profile-generating system.

The large language model 2216 may receive structured data and insights from the deep learning module 2204, CNN (see, e.g., convolutional neural network 2222 in FIG. 22 or convolutional neural network 2322 in FIG. 23), and artificial neural network 2202, which analyze user-submitted content and behaviors to identify key professional traits and skills. The large language model 2216 uses this information to generate detailed descriptions that accurately reflect the user's professional experiences and achievements. In collaboration with the AI-driven search module 2214, it helps to incorporate relevant, up-to-date professional information from external sources, ensuring the profile remains current. The classifier's 2206 outputs are utilized by the large language model 2216 to tailor the language and tone of the profile, making it resonate with the intended audience. Moreover, inputs from the rules-based engineering module 2208 and the logic learning machine module 2210 enable the large language model 2216 to adhere to predetermined logic and patterns, ensuring the generated content meets specific standards and guidelines. The natural language processing module 2218 further refines the large language model's 2216 output, enhancing its ability to understand and generate human-like text, thereby ensuring the digital profiles are contextually relevant to the intended audience.

Figure 23:
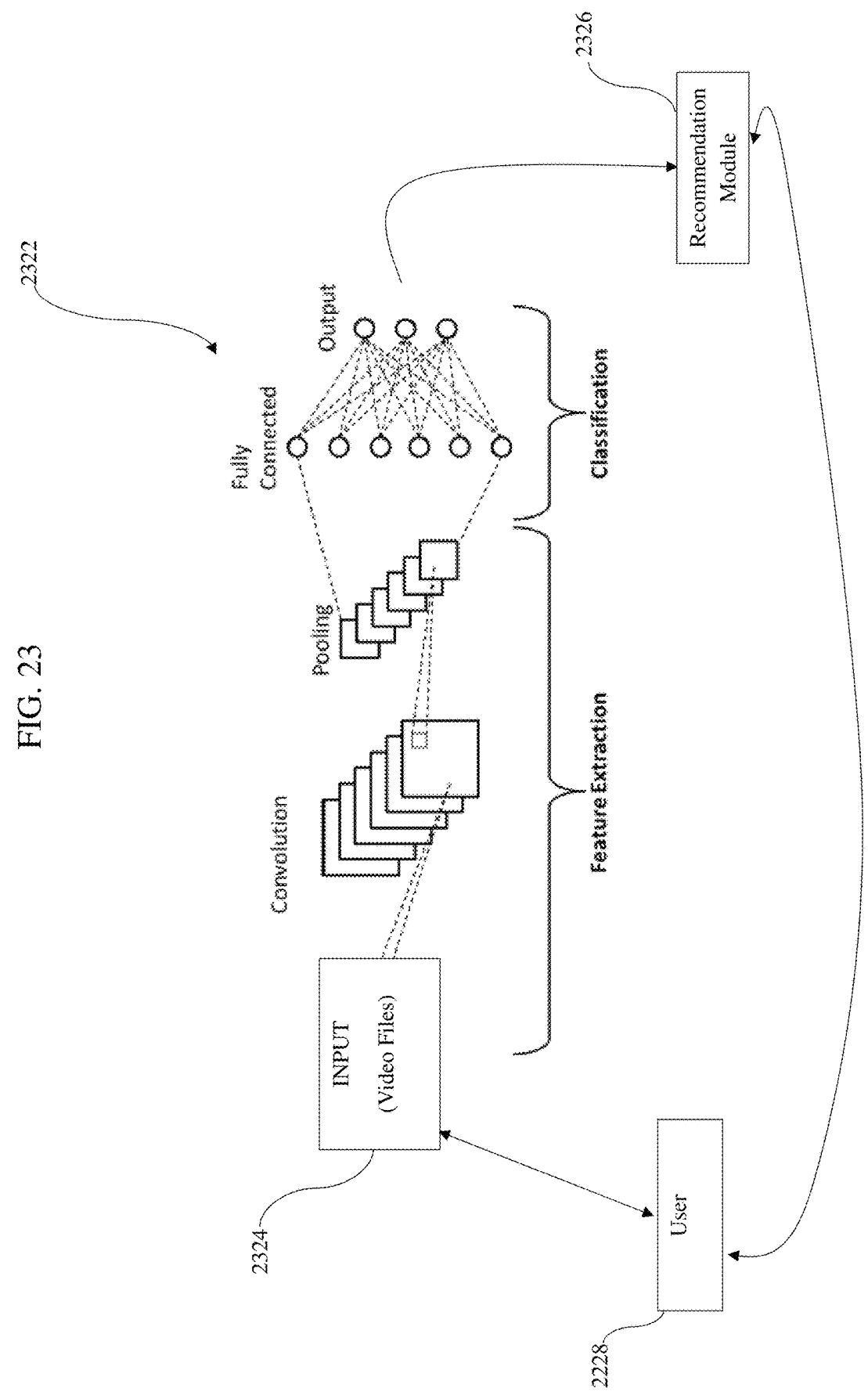
FIG. 23 is a schematic illustration of a convolutional neural network employable by the machine learning model of FIG. 22 according to aspects of the present disclosure.

The natural language processing module 2218 may play a role in understanding and generating human language, enabling the system to process and interpret user 2228 inputs, feedback, and textual content within digital profiles (see, e.g., convolutional neural network 2222 in FIG. 22 or convolutional neural network 2322 in FIG. 23). The natural language processing module 2218 may analyze the structured data provided by modules like the convolutional neural network (see, e.g., convolutional neural network 2222 in FIG. 22 or convolutional neural network 2322 in FIG. 23) and the deep learning module 2204, extracting meaningful insights about professional experiences and skills. The natural language processing module 2218 also enhances the readability and personalization of the digital profiles by refining the language used, ensuring that it's not only accurate but also engaging and accessible to the intended audience. Furthermore, it supports interactive features, such as responding to user 2228 queries or feedback in natural, conversational language, making the system more user-friendly and dynamic.

The natural language processing module 2218 enhances its functionality through interactions with various other modules, ensuring a robust integration of language understanding and generation capabilities. The natural language processing module 2218 works closely with the large language model 2216 to refine and craft user-specific descriptions, utilizing the large language model's 2216 extensive database of language patterns to produce contextually relevant and coherent text that corresponds with the user's profiles. The natural language processing module 2218 also processes and interprets data from the deep learning module 2204 and the convolutional neural network (see, e.g., convolutional neural network 2222 in FIG. 22 or convolutional neural network 2322 in FIG. 23), translating intricate patterns and visual insights into descriptive textual elements that add depth and detail to the profiles and potentially provide recommendations to the user 2228. In collaboration with the AI-driven search module 2214, the natural language processing module 2218 optimizes search queries to source the most relevant external information, keeping the profiles current with the latest professional achievements and trends. The classifier's 2206 categorizations guide the natural language processing module 2218 in tailoring the textual content to align with the user's identified traits and preferences, ensuring a high degree of personalization. Furthermore, the natural language processing module 2218 applies the structured data and logical frameworks developed by the rules-based engineering module 2208 and the logic learning machine module 2210 to apply consistent linguistic standards and adapt the user's profile content to reflect logical deductions, maintaining both clarity and relevance in the user's digital presence.

The machine learning model may also include a convolutional neural network (CNN) (see, e.g., convolutional neural network 2222 in FIG. 22 or convolutional neural network 2322 in FIG. 23). In particular, the CNN (e.g. 2222 and/or 2322) can be employed to perform the video analysis described herein based parsing various video files (see, e.g., video files 2224 in FIG. 22 or video files 2324 in FIG. 23) from a user 2228, and recommendations may be made to the user 2228 via the recommendation module (see, e.g., recommendation module 2226 in FIG. 22 or recommendation module 2326 in FIG. 23).

FIG. 23 is a schematic illustration of a convolutional neural network (CNN) (see, e.g., convolutional neural network 2222 in FIG. 22 or convolutional neural network 2322 in FIG. 23) employable by the machine learning model 2200 of FIG. 22 according to aspects of the present disclosure.

Based on the user-submitted video, the CNN (see, e.g., convolutional neural network 2222 in FIG. 22 or convolutional neural network 2322 in FIG. 23) will generate an output for the recommendation module (see, e.g., recommendation module 2226 in FIG. 22 or recommendation module 2326 in FIG. 23). The recommendation module (e.g. 2226 and/or 2326) can then analyze this output to assess the user's skills against industry benchmarks to identify and suggest areas for improvement, such as recommending targeted educational resources or certifications. Additionally, the recommendation module (e.g. 2226 and/or 2326 might curate and recommend professional development content, including articles, tutorials, and seminars, to keep users up-to-date with the latest industry trends and best practices. Networking opportunities tailored to the user's professional interests could also be suggested, facilitating connections with peers and mentors. Moreover, by understanding a user's skills and career aspirations, the module could match the user 2228 with potential job opportunities.

The output provided by the CNN (see, e.g., convolutional neural network 2222 in FIG. 22 or convolutional neural network 2322 in FIG. 23) may include recommendations for how to improve the various videos provided by the user 2228. For example, parsing the videos by the CNN (e.g. 2222 and/or 2322) may identify a lack of a eye contact, an inconsistency in tone, or a selection of language or terms that could be improved. The recommendation might be to maintain better or longer eye contact with a camera, to maintain a more consistent and even tone, to speak slower or more clearly, or to select more or less industry-specific jargon.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor 2110 include an application-specific integrated circuit (ASIC) and a field-programmable gate array (FPGA) 2130.

Figure 24:
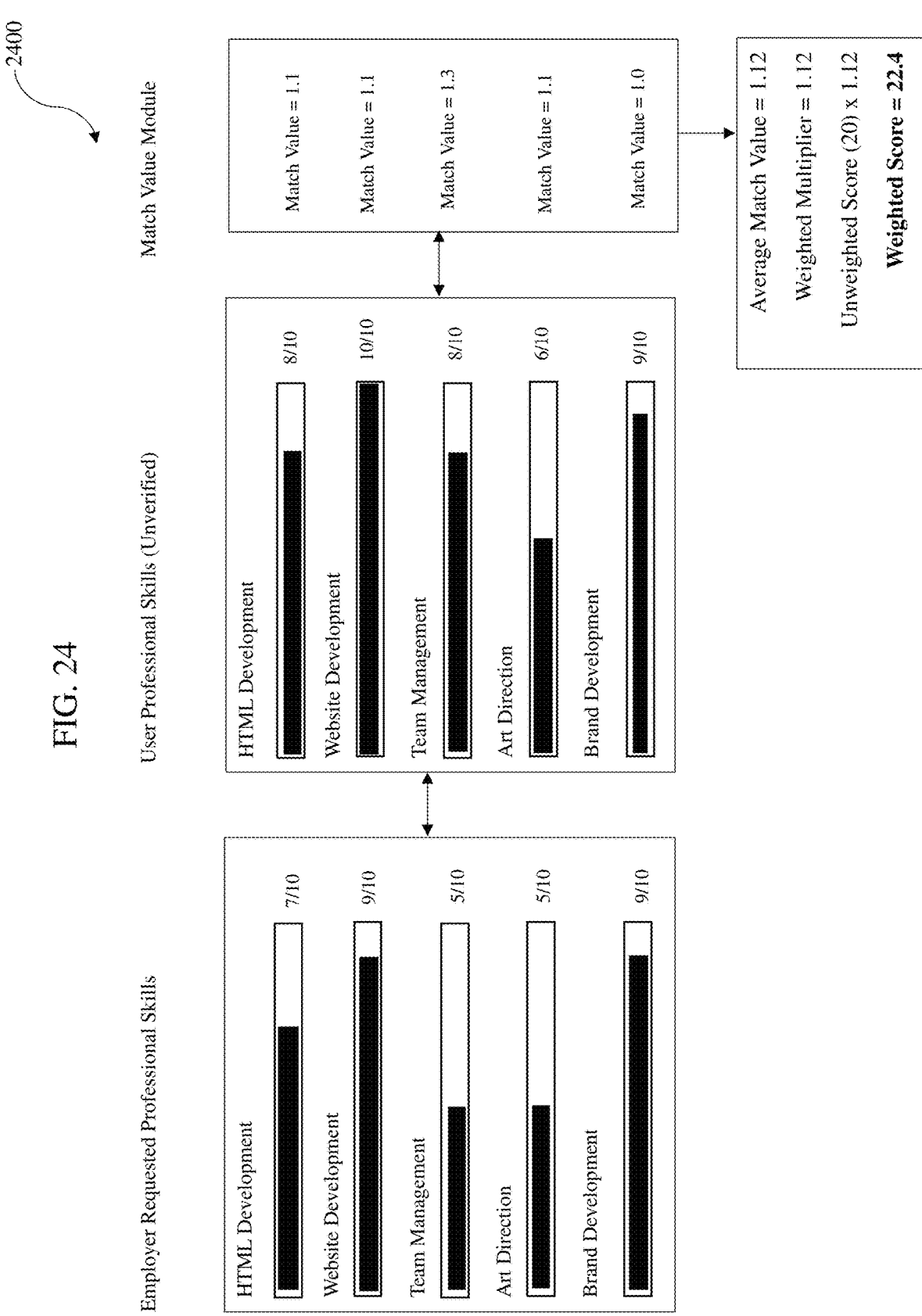
FIG. 24 is a flowchart of an exemplary method of weighing a rating score for a user based on user described professional skills.
Figure 25:
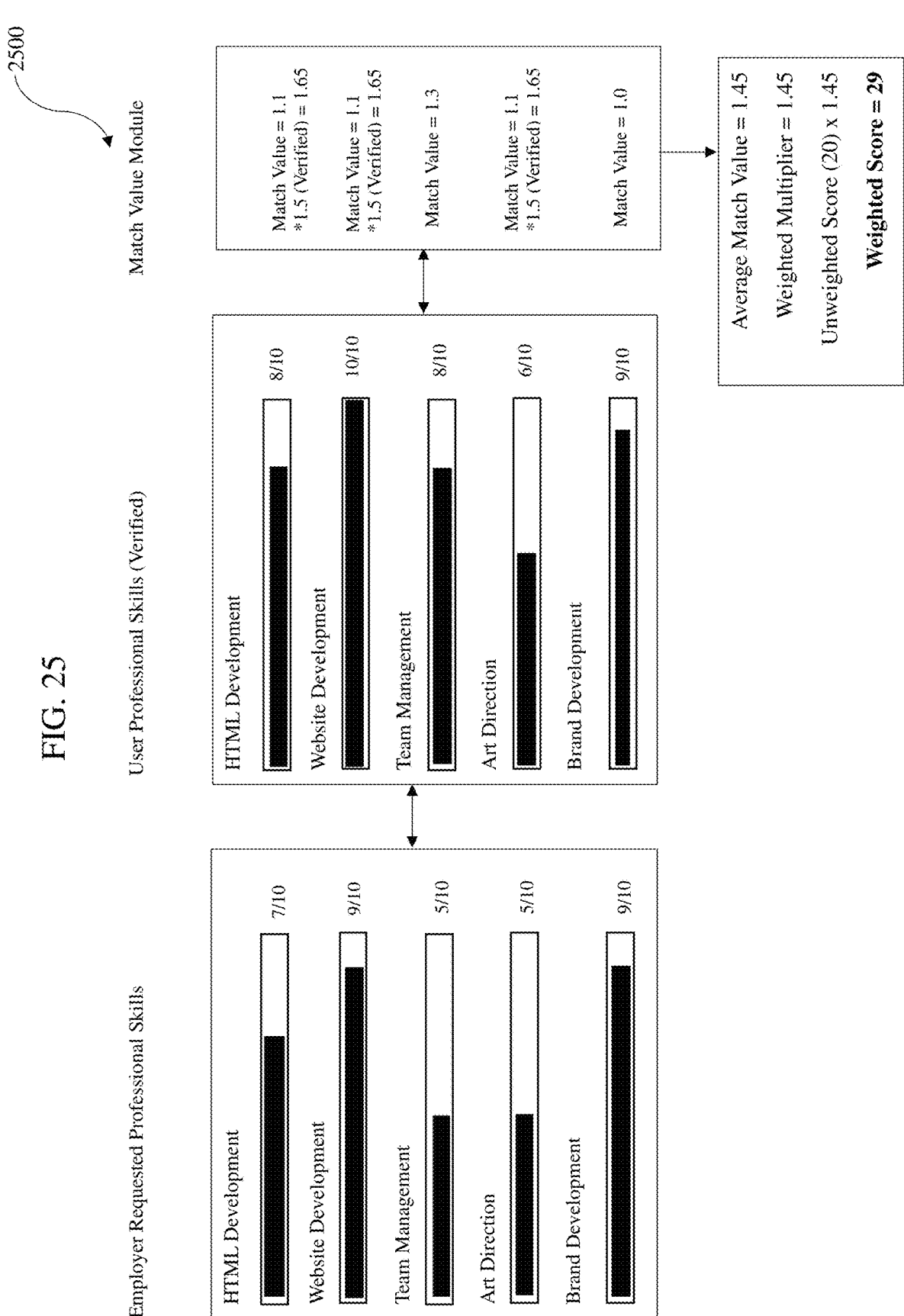
FIG. 25 is a flowchart of an exemplary method of weighing a rating score for a user based on third party verified professional skills.

FIG. 24 is a flowchart of an exemplary method of weighing a rating score for a user based on user described professional skills 2400. FIG. 25 is a flowchart of an exemplary method of weighing a rating score for a user based on third party verified professional skills 2500.

Referring particularly to FIGS. 24 and 25, some number of the professional skills ratings may be third party verified, as described herein, indicating that the rating of skill level provided by a user is confirmed to be accurate. As an example, all of the professional skill ratings may be verified, or some number less than all may be verified. In the example provided in FIG. 25, three of the skill ratings are verified. Correspondingly, an increased multiplier value may be applied when ratings are third party verified. That is, a match score between a user/potential employee and an employer might be increased by a higher multiplier value when the ratings are third party verified. In other words, a potential employee showing a high degree of match between an asserted professional skill set and a requested skill set from an employer will have a higher weighted score with respect to a general rating score (see, e.g., unweighted score 20 and weighted score 22.4 in FIG. 4). However, an analogous user/potential employee with third party verified professional skill scores might have a higher weighted rating (see, e.g., weighted score 29 in FIG. 25).

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A computer-implemented method of cultivating a digital profile, comprising:

receiving personal contact information for a user;

receiving at least one video from the user, wherein the at least one video includes information about professional experience of the user;

processing the at least one video using a trained machine learning model that includes a convolutional neural network (CNN) to analyze visual characteristics of the at least one video and generate machine-derived evaluation data associated with the professional experience of the user;

providing the machine-derived evaluation data to one or more of a deep learning module, a classifier, a rules-based engineering model, or a logic learning machine module of the machine learning model to generate automated professional skill evaluation data for the user based on the machine-derived evaluation data;

receiving at least one summary statement about the professional experience of the user;

receiving at least one website or social media link for the user;

receiving a detailed description of the professional experience of the user;

receiving a list of a plurality of professional skills of the user;

receiving a level of experience rating from the user for each professional skill of the plurality of professional skills of the user;

generating, using at least one of a natural language processing module or a large language model of the machine learning model, profile content for the digital profile based at least in part on the automated professional skill evaluation data generated from the video;

generating a professional rating for the user based on the list of the plurality of professional skills of the user, the level of experience rating received from the user for each professional skill of the plurality of professional skills of the user, and the automated professional skill evaluation data generated by the machine learning model;

receiving a plurality of professional skill requests from a potential employer;

receiving a minimum level of experience rating request from the potential employer for each professional skill of the plurality of professional skills;

comparing each professional skill of the plurality of professional skills of the user with the corresponding professional skill of the plurality of professional skill requests from the potential employer;

comparing each level of experience rating of the user with the corresponding minimum level of experience rating request received from the potential employer;

determining a match value between each level of experience rating of the user and the corresponding minimum level of experience rating request received from the potential employer;

determining an overall match value for the user with respect to an employment opportunity from the potential employer by combining each of the determined match values;

adjusting the professional rating for the user based on the determined overall match value for the user with respect to the employment opportunity to generate a weighted professional rating for the user;

compiling a personal digital profile for the user, wherein the personal digital profile includes the personal contact information for the user, the at least one video, the at least one summary statement, the at least one website or social media link, the detailed description, the list of the plurality of professional skills, the level of experience for each professional skill of the plurality of professional skills, the profile content generated using the natural language processing module or the large language model, and the weighted professional rating for the user; and transmitting the personal digital profile for the user to a potential reviewer.

2. The computer-implemented method of claim 1, wherein the at least one video includes a plurality of videos of the user.

3. The computer-implemented method of claim 2, wherein the videos of the plurality of videos of the user are different lengths from each other.

4. The computer-implemented method of claim 1, further including:

receiving at least one professional endorsement for the user from another user; and modifying the professional rating for the user based on the received at least one professional endorsement for the user received from the other user.

5. The computer-implemented method of claim 1, further including:

receiving at least one personal endorsement for the user from another user; and modifying the professional rating for the user based on the received at least one personal endorsement for the user received from the other user.

6. The computer-implemented method of claim 1, further including:

receiving at least one professional endorsement for the user from a third party source; and modifying the professional rating for the user based on the received at least one professional endorsement for the user received from the third party source.

7. The computer-implemented method of claim 1, further including:

receiving a level of educational attainment for the user; and receiving a name of at least one professional degree or professional certificate attained by the user, wherein the personal digital profile for the user is compiled to include the level of educational attainment for the user and the name of the at least one professional degree or the professional certificate attained by the user.

8. The computer-implemented method of claim 7, further including:

receiving at least one link to a professional work product of the user, wherein the professional work product relates to at least one professional skill of the plurality of professional skills of the user, and wherein the personal digital profile for the user is compiled to include the at least one link to the professional work product of the user.

9. The computer-implemented method of claim 8, wherein the level of educational attainment for the user is verified from a third party source.

10. The computer-implemented method of claim 1, further including:

verifying each level of experience rating received from the user for each professional skill of the plurality of professional skills of the user by communicating with a third party;

generating a plurality of verified level of experience ratings for the user; and displaying a visual indicator for each verified level of experience rating of the plurality of verified level of experience ratings for the user.

11. The computer-implemented method of claim 1, further including:

generating a non-fungible token (NFT) associated with the personal digital profile; and verifying the authenticity of the NFT associated with the personal digital profile by communicating with a block-chain, wherein verifying the authenticity of the NFT associated with the personal digital profile is used to verify the authenticity of the personal digital profile.

12. The computer-implemented method of claim 1, further including identifying at least one additional professional rating for the user provided by a third party source, wherein the personal digital profile for the user is compiled to include the at least one additional professional rating for the user.

13. The computer-implemented method of claim 1, further including:

reviewing the at least one video received from the user; and recommending at least one of a way to improve the at least one video to appeal better to a potential reviewer based on the review of the at least one video.

14. The computer-implemented method of claim 1, further including:

reviewing the at least one video received from the user;

evaluating the information about the professional experience of the user included in the video;

assessing the accuracy of the professional experience of the user included in the video; and providing a report of the assessed accuracy of the professional experience of the user included in the video.

15. The computer-implemented method of claim 1, further including:

receiving information regarding the volunteer or charitable activities performed by the user; and generating a charitable rating for the user based on the received information regarding the volunteer or charitable activities performed by the user, wherein the personal digital profile for the user is compiled to include the charitable rating for the user.

16. The computer-implemented method of claim 1, further including receiving at least one video endorsement for the user, wherein the personal digital profile for the user is compiled to include the at least one video endorsement for the user.

* * * * *